United States Patent
Wang et al.

(10) Patent No.: US 11,153,802 B2
(45) Date of Patent: *Oct. 19, 2021

(54) SYSTEM AND METHODS FOR MANAGING A USER DATA PATH

(71) Applicant: AT&T Intellectual Property I, L.P., Atlanta, GA (US)

(72) Inventors: Jiansong Wang, Parlin, NJ (US); Joseph Dahan, Redmond, WA (US); Ryan Redfern, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/527,440

(22) Filed: Jul. 31, 2019

(65) Prior Publication Data

US 2019/0357113 A1 Nov. 21, 2019

Related U.S. Application Data

(63) Continuation of application No. 15/818,402, filed on Nov. 20, 2017, now Pat. No. 10,412,655, which is a
(Continued)

(51) Int. Cl.
*H04W 40/04* (2009.01)
*H04W 28/12* (2009.01)
(Continued)

(52) U.S. Cl.
CPC ........... *H04W 40/04* (2013.01); *H04W 28/12* (2013.01); *H04W 76/12* (2018.02); *H04W 76/22* (2018.02); *H04W 76/32* (2018.02)

(58) Field of Classification Search
None
See application file for complete search history.

(56) References Cited

U.S. PATENT DOCUMENTS

| 7,328,035 B2 | 2/2008 | Kelley et al. |
| 8,401,068 B2 | 3/2013 | Ulupinar et al. |

(Continued)

FOREIGN PATENT DOCUMENTS

JP 2012-170162 9/2012

OTHER PUBLICATIONS

"General Packet Radio System (GPRS) Tunnelling Protocol User Plane (GTPv1-U) (Release 11)", 3GPP TS 29.281 V11.3.0 (Jun. 2012).

(Continued)

*Primary Examiner* — Bob A Phunkulh
(74) *Attorney, Agent, or Firm* — Guntin & Gust, PLC; Jay Anderson

(57) ABSTRACT

Aspects of the subject disclosure may include, for example, a device that determines each of a default downlink forwarding address of a first interface of a user plane and a currently used downlink forwarding address of the first interface of the user plane. One of an uplink user data packet comprising an origination address of a second interface of the user plane, a downlink user data packet comprising a destination address of the second interface of the user plane or both are received, by way of the user plane. One of the default downlink forwarding address, the currently used downlink forwarding address or both can be modified based on the uplink origination address, the destination address or both. Modification of the default downlink forwarding address, the currently used downlink forwarding address or both results in a redirection of an associated packet flow within the user plane. Other embodiments are disclosed.

20 Claims, 18 Drawing Sheets

Related U.S. Application Data continuation of application No. 15/363,900, filed on Nov. 29, 2016, now Pat. No. 9,854,499, which is a continuation of application No. 14/512,840, filed on Oct. 13, 2014, now Pat. No. 9,538,563.

(51) Int. Cl.
  *H04W 76/12* (2018.01)
  *H04W 76/22* (2018.01)
  *H04W 76/32* (2018.01)

(56) References Cited

U.S. PATENT DOCUMENTS

| | | | |
|---|---|---|---|
| 8,422,452 | B2 | 4/2013 | Zembutsu et al. |
| 8,520,636 | B2 | 8/2013 | Xu |
| 8,532,046 | B2 | 9/2013 | Hu et al. |
| 8,619,654 | B2 | 12/2013 | Zhu et al. |
| 8,699,454 | B2 | 4/2014 | Hapsari et al. |
| 8,699,461 | B2 | 4/2014 | Qian et al. |
| 8,711,806 | B2 | 4/2014 | Lim et al. |
| 8,804,667 | B2 | 8/2014 | Wang |
| 8,817,741 | B2 | 8/2014 | Shaheen |
| 9,510,376 | B2 | 11/2016 | Wang et al. |
| 2009/0240795 | A1 | 9/2009 | Tsirtsis et al. |
| 2010/0046418 | A1 | 2/2010 | Horn et al. |
| 2010/0111041 | A1* | 5/2010 | Lim ............... H04W 36/02 370/331 |
| 2010/0124223 | A1 | 5/2010 | Gibbs et al. |
| 2010/0153727 | A1 | 6/2010 | Reznik et al. |
| 2011/0255471 | A1* | 10/2011 | Sundell ............ H04W 36/02 370/328 |
| 2011/0268085 | A1 | 11/2011 | Barany et al. |
| 2011/0269495 | A1* | 11/2011 | Hapsari ............ H04W 36/14 455/517 |
| 2011/0280173 | A1 | 11/2011 | Ha et al. |
| 2011/0294509 | A1 | 12/2011 | Kim et al. |
| 2012/0039240 | A1* | 2/2012 | Han ................. H04B 7/2606 370/315 |
| 2012/0051216 | A1* | 3/2012 | Zhang ............. H04W 28/0284 370/230 |
| 2012/0076047 | A1 | 3/2012 | Turányi et al. |
| 2012/0076099 | A1* | 3/2012 | Yin ................. H04L 12/4633 370/329 |
| 2012/0144226 | A1 | 6/2012 | Yang et al. |
| 2012/0184294 | A1 | 7/2012 | Stojanovski et al. |
| 2012/0189016 | A1 | 7/2012 | Bakker et al. |
| 2012/0250509 | A1 | 10/2012 | Leung et al. |
| 2012/0327908 | A1 | 12/2012 | Gupta et al. |
| 2013/0028421 | A1 | 1/2013 | Feng et al. |
| 2013/0058308 | A1* | 3/2013 | Jaiswal ............. H04L 47/34 370/331 |
| 2013/0163424 | A1 | 6/2013 | Goerke et al. |
| 2013/0201904 | A1 | 8/2013 | Toskala et al. |
| 2013/0235845 | A1 | 9/2013 | Kovvali et al. |
| 2013/0294403 | A1 | 11/2013 | Srinivasan |
| 2013/0315068 | A1 | 11/2013 | Kim et al. |
| 2013/0324114 | A1* | 12/2013 | Raghothaman ....... H04W 8/005 455/426.1 |
| 2014/0003394 | A1 | 1/2014 | Rubin et al. |
| 2014/0010207 | A1* | 1/2014 | Horn ............... H04W 36/165 370/332 |
| 2014/0079049 | A1* | 3/2014 | Friman ............. H04W 76/12 370/338 |
| 2014/0086152 | A1 | 3/2014 | Bontu et al. |
| 2014/0112151 | A1 | 4/2014 | Olsson et al. |
| 2014/0169332 | A1 | 6/2014 | Taleb et al. |
| 2014/0187245 | A1* | 7/2014 | Xu ................. H04W 36/125 455/436 |
| 2014/0204754 | A1 | 7/2014 | Jeong et al. |
| 2014/0233384 | A1* | 8/2014 | Howard ........... H04W 28/0289 370/235 |
| 2014/0293882 | A1 | 10/2014 | Choi et al. |
| 2014/0301191 | A1 | 10/2014 | Ludwig et al. |
| 2016/0029251 | A1* | 1/2016 | Kahn .............. H04W 36/08 370/331 |
| 2016/0127959 | A1* | 5/2016 | Miao ............... H04W 36/12 370/331 |
| 2016/0142977 | A1* | 5/2016 | Hoffmann ......... H04W 52/0219 370/311 |
| 2016/0227443 | A1* | 8/2016 | Tomici ............ H04W 8/04 |
| 2016/0234124 | A1* | 8/2016 | Tomici ............ H04W 28/24 |
| 2017/0086123 | A1 | 3/2017 | Wang |
| 2017/0111841 | A1* | 4/2017 | Henttonen ........ H04W 36/28 |
| 2017/0223148 | A1* | 8/2017 | Roeland .......... H04W 36/125 |
| 2018/0084477 | A1 | 3/2018 | Wang et al. |

OTHER PUBLICATIONS

"Local IP Access and Selected IP Traffic Offload (LIPA-SI PTO) (Release 10)", 3GPP TR 23.829 V10.0.1 (Oct. 2011).

"Network architecture (Release 11)", 3GPP TS 23.002 V11.3.0 (Jun. 2012).

Hahn, "Flat 3GPP Evolved Packet Core", 2011 14th International Symposium on Wireless Personal Multimedia Communications (WPMC). Oct. 2011. pp. 1-5.

Liebl, "Experimental Testbed for 3GPP System Architecture Evolution", SIMUTools '10 Proceedings of the 3rd International ICST Conference on Simulation Tools and Techniques. 2010. Article 88.

* cited by examiner

200A

200B

200C

200D

SYSTEM AND METHODS FOR MANAGING A USER DATA PATH

CROSS-REFERENCE TO RELATED APPLICATIONS

This application is a continuation of U.S. application Ser. No. 15/818,402, filed Nov. 20, 2017, which is a continuation of U.S. application Ser. No. 15/363,900, filed Nov. 29, 2016 (now U.S. Pat. No. 9,854,499), which is a continuation of U.S. application Ser. No. 14/512,840, filed Oct. 13, 2014 (now U.S. Pat. No. 9,538,563), which are incorporated herein by reference in their entirety.

FIELD OF THE DISCLOSURE

The subject disclosure relates to a system and methods for managing a user data path and more particularly to optimized user data path management in an enhanced packet core of a long-term evolution network.

BACKGROUND

Wireless telecommunication networks use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communications technologies are used in connection with user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology. One or more applications running on such devices, such as Voice over IP (VoIP), browsing, streaming media, text messaging and so forth, can engage in an exchange of data packets with another network, such as the Internet, an IP multimedia subsystem, and/or some other provider network.

Currently user data plane paths, such as those in a Long Term Evolution (LTE) access network, are always managed by the control plane in the life of a Packet Data Network (PDN) connection. Indeed, a centralized control plane management scheme is critical to data session establishment, release and management. In mobile communication scenario, such as wireless cellular communications, data plane connections can depend on a mobility state and a session state of a mobility control layer. Heretofore, such centralized control plane schemes have been particularly important for establishing and managing data plane connections in view of variable mobility states.

Consider a mobile user terminal (UE) having established a packet forwarding connection through a packet data network connection. User data packets are forwarded through a radio access node, such as an enhanced Node B (eNB) terminal. If the UE travels out of range of a particular eNB, a handover would be necessary to a neighboring eNB. The handover would result in packet forwarding through a different entity, i.e., the neighboring eNB. Control plane management schemes generally anticipate such mobility and implement the appropriate measures to reconfigure the user data packet forwarding accordingly.

BRIEF DESCRIPTION OF THE DRAWINGS

Reference will now be made to the accompanying drawings, which are not necessarily drawn to scale, and wherein.

DETAILED DESCRIPTION

Figure 1:
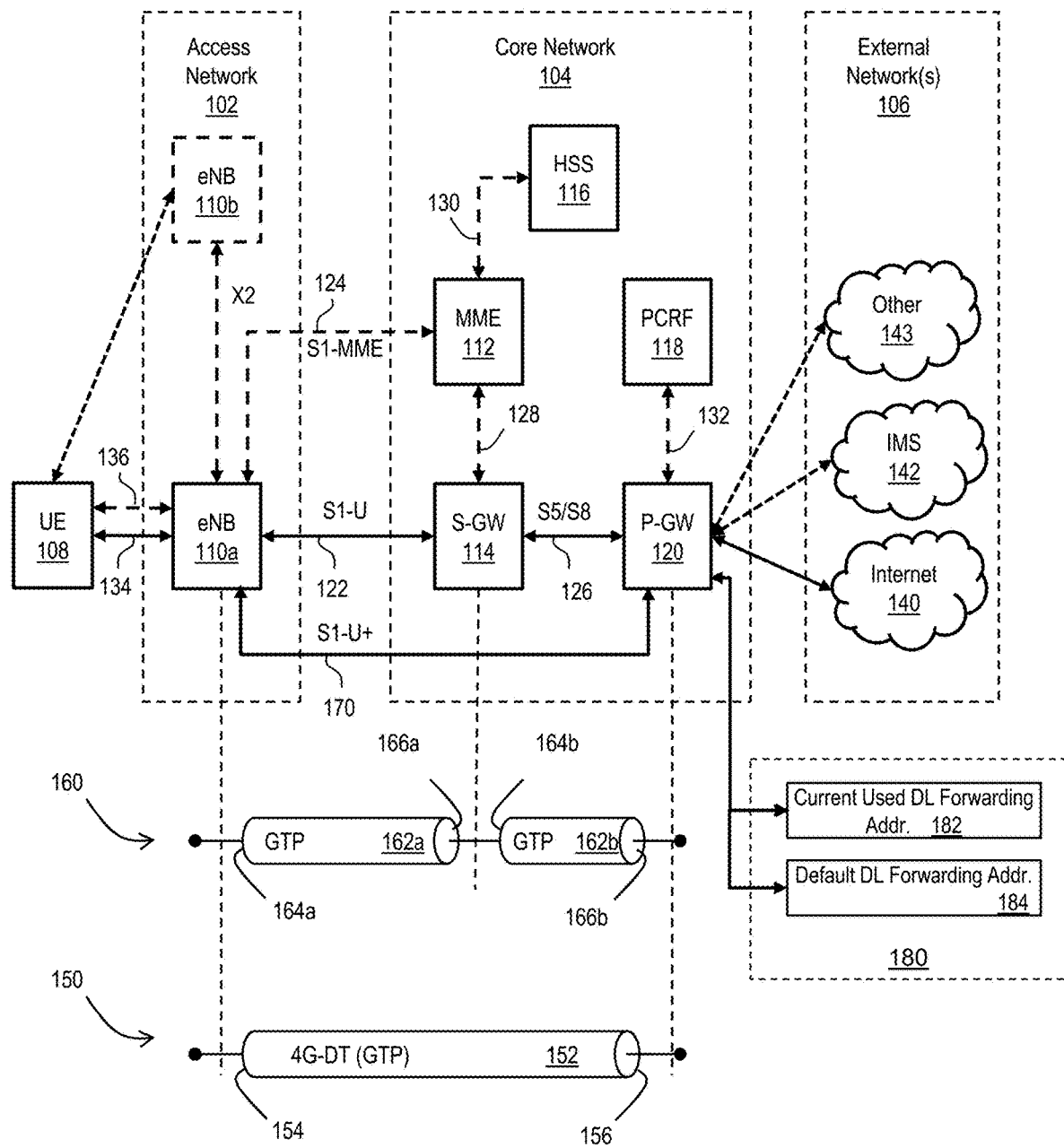
FIG. 1 depicts an illustrative embodiment of a communication network including an LTE, Evolved Packet Core (EPC) topology.

Unfortunately, handover scenarios, such as those disclosed herein, can impose an excessive signaling load. Such an excessive signaling load can adversely impact operation of one or more network nodes, such as the mobility nodes of an LTE network, i.e., a Serving General Packet Radio Service (GPRS) Support Node (SGSN) and/or a Mobility Management Entity (MME), and one or more EPC gateway nodes, i.e., a Serving Gateway (SGW) node and a PDN Gateway (PGW) in an EPC network.

One or more aspects of the subject disclosure include a novel methodology implemented in a network user plane in which one or more nodes autonomously learn peer transport layer addresses to allow for self-configuration of a packet forwarding path. Such self-configurations can be accomplished within the user plane without requiring intervention by a corresponding network control plane. Beneficially, such self-configurations in relation to handover events within a mobility network can reduce signaling load on network nodes, such as SGWs and PGWs. This disclosure can be considered an extension to a direct-tunnel solution disclosed in U.S. patent application Ser. No. 14/036,919, filed Sep. 25, 2013, to Wang, et al., and entitled "Tunneling Packet Exchange in Long Term Evolution Protocol Based Networks." The entire disclosure of the aforementioned application is incorporated herein by reference in its entirety.

It can be said that the techniques disclosed herein simplify, and in that sense optimize control signaling procedures, such as those associated with direct tunnel solutions, to reduce processing burden on the SGW and/or PGW nodes.

The subject disclosure describes, among other things, illustrative embodiments of tunneling packet exchanges in LTE protocol based networks. Application of GPRS Tunneling Protocol (GTP) to tunnel user packets exists today within LTE protocol based networks. GTP is an IP-based protocol that allows end users of a wireless mobile network to move from place to place, while continuing to connect to the Internet as if from one location at the core network. It does this by carrying the subscriber's data from the subscriber's current serving support node to a gateway support node which is handling the subscriber's session. Current applications of GTP technology within LTE based networks, however, are inefficient at least in that user packets must go through the SGW. The subject disclosure describes a new standard tunneling interface, e.g., directly between a Radio Access Network and the PGW, or Data Session Anchor Point, by bypassing the SGW. The direct tunnel offers benefits, including, improved network efficiency, reduced user packet delay, and improved end-user perceived data throughput. In at least some embodiments, the direct tunneling interface disclosed herein can utilize the GTP protocol. Other embodiments are included in the subject disclosure.

One embodiment of the subject disclosure includes a device that includes a processor and a memory that stores executable instructions that, when executed by the processor, facilitate performance of operations. The operations include determining a default downlink forwarding address of a first interface of a user plane and determining a currently used downlink forwarding address of the first interface of the user plane. The operations further include receiving, by way of the user plane, one of an uplink user data packet comprising an origination address of a second interface of the user plane, a downlink user data packet comprising a destination address of the second interface of the user plane or both. One of the default downlink forwarding address, the currently used downlink forwarding address or both is modified based on the uplink origination address, the destination address or both. Modification of the default downlink forwarding address, the currently used downlink forwarding address or both results in a redirection of an associated packet flow within the user plane.

Another embodiment of the subject disclosure includes a process that includes determining, by a system comprising a processor, a default downlink forwarding address of an interface of a user plane, and determining, by the system, a currently used downlink forwarding address of the interface of the user plane. An uplink user data packet is received, by the system, by way of the user plane. The uplink user data packet includes an origination address of the user plane, and a downlink user data packet includes a destination address of the user plane. One of the default downlink forwarding address, the currently used downlink forwarding address or both is modified, by the system. The modification is based on one of an origination address of the received data packet, a destination address of the received data packet or both. Modification of the default downlink forwarding, the currently used downlink forwarding address or both results in a redirection of an associated packet flow.

Yet another embodiment of the subject disclosure includes a machine-readable storage medium, comprising executable instructions that, when executed by a processor, facilitate performance of operations. The operations include receiving, by way of a user plane, an uplink user data packet comprising an origination address of the user plane. The operations further include determining a downlink destination address based on the origination address, and modifying the downlink forwarding address based on the determining of the downlink destination address. Modification of the default downlink forwarding results in a redirection of an associated packet flow without control plane coordination.

The present disclosure broadly discloses a method, a non-transitory machine readable medium and an apparatus for performing packet routing in a network architecture, such as the LTE, Evolved Packet System (EPS) network architecture. FIG. 1 illustrates a functional block diagram depicting one example of an LTE-EPS network architecture 100 related to the current disclosure. In particular, the network architecture 100 disclosed herein is referred to as a modified LTE-EPS architecture 100 to distinguish it from a traditional LTE-EPS architecture.

An example modified LTE-EPS architecture 100 is based at least in part on standards developed by the 3rd Generation Partnership Project (3GPP), with information available at www.3gpp.org. In one embodiment, the LTE-EPS network architecture 100 includes an access network 102, a core network 104, e.g., an EPC or Common BackBone (CBB) and one or more external networks 106, sometimes referred to as PDN or peer entities. Different external networks 106 can be distinguished from each other by a respective network identifier, e.g., a label according to DNS naming conventions describing an access point to the PDN. Such labels can be referred to as Access Point Names (APN). The external networks 106 can include one or more trusted and non-trusted external networks such as an internet protocol (IP) network 140, an IP multimedia subsystem (IMS) network 142, and other networks 143, such as a service network, a corporate network and the like.

The access network 102 can include an LTE network architecture sometimes referred to as Evolved Universal mobile Telecommunication system Terrestrial Radio Access (E UTRA) and evolved UMTS Terrestrial Radio Access Network (E-UTRAN). Broadly, the access network 102 can include one or more communication devices, commonly referred to as UE 108, and one or more wireless access nodes, or base stations 110a, 110b (generally 110). During network operations, at least one base station 110 communicates directly with the UE 108. The base station 110 can be an evolved Node B (e-NodeB), with which the UE 108 communicates over the air and wirelessly. The UEs 108 can include, without limitation, wireless devices, e.g., satellite communication systems, portable digital assistants (PDAs), laptop computers, tablet devices and other mobile devices (e.g., cellular telephones, smart appliances, and so on). Such UEs 108 can connect to the eNBs 110 when the UE 108 is within range according to a corresponding wireless communication technology.

The UE 108 generally runs one or more applications that engage in a transfer of packets between the UE 108 and one or more of the external networks 106. Such packet transfers can include one of downlink packet transfers from the external network 106 to the UE 108, uplink packet transfers from the UE 108 to the external network 106 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within the core network 104, e.g., according to parameters, such as the QoS.

The core network 104 uses a concept of bearers, e.g., EPS bearers, to route packets, e.g., IP traffic, between a particular gateway in the core network 104 and the UE 108. A bearer refers generally to an IP packet flow with a defined QoS between the particular gateway and the UE 108. The access network 102, e.g., E UTRAN, and the core network 104 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 104 includes various network entities, such as an MME 112, a SGW 114, a Home Subscriber Server (HSS) 116, a Policy and Charging Rules Function (PCRF) 118 and a PGW 120. In one embodiment, the MME 112 comprises a control node performing a control signaling between various equipment and devices in the access network 102 and the core network 104. The protocols running between the UE 108 and the core network 104 are generally known as Non-Access Stratum (NAS) protocols.

For illustration purposes only, the terms MME 112, SGW 114, HSS 116 and PGW 120, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, the SGW 114 routes and forwards all user data packets. The SGW 114 also acts as a mobility anchor for user plane operation during handovers between base stations, e.g., during a handover from a first eNB 110a to a second eNB 110b as may be the result of the UE 108 moving from one area of coverage, e.g., cell, to another. The SGW 114 can also terminate a downlink data path, e.g., from the external network 106 to the UE 108 in an idle state, and trigger a paging operation when downlink data arrives for the UE 108. The SGW 114 can also be configured to manage and store a context for the UE 108, e.g., including one or more of parameters of the IP bearer service and network internal routing information. In addition, the SGW 114 can perform administrative functions, e.g., in a visited network, such as collecting information for charging (e.g., the volume of data sent to or received from the user), and/or replicate user traffic, e.g., to support a lawful interception. The SGW 114 also serves as the mobility anchor for interworking with other 3GPP technologies such as universal mobile telecommunication system (UMTS).

At any given time, the UE 108 is generally in one of three different states: "detached", "idle" or "active." The detached state is typically a transitory state in which the UE 108 is powered on but is engaged in a process of searching and registering with the network 102. In the active state, the UE 108 is registered with the access network 102 and has established a wireless connection, e.g., radio resource control (RRC) connection, with the eNB 110. Whether the UE 108 is in an active state can depend on the state of a packet data session, and whether there is an active packet data session. In the idle state, the UE 108 is generally in a power conservation state in which the UE 108 typically does not communicate packets. When the UE 108 is idle, the SGW 114 can terminate a downlink data path, e.g., from one of the peer entities 106, and triggers paging of the UE 108 when data arrives for the UE 108. If the UE 108 responds to the page, the SGW 114 can forward the IP packet to the eNB 110a.

The HSS 116 can manage subscription-related information for a user of the UE 108. For example, the HSS 116 can store information such as authorization of the user, security requirements for the user, quality of service (QoS) requirements for the user, etc. The HSS 116 can also hold information about the external networks 106 to which the user can connect, e.g., in the form of an APN of the external networks 106. For example, the MME 112 can communicate with the HSS 116 to determine if the UE 108 is authorized to establish a call, e.g., a voice over IP (VoIP) call before the call is established.

The PCRF 118 can perform QoS management functions and policy control. The PCRF 118 is responsible for policy control decision-making, as well as for controlling the flow-based charging functionalities in a policy control enforcement function (PCEF), which resides in the PGW 120. The PCRF 118 provides the QoS authorization, e.g., QoS class identifier and bit rates that decide how a certain data flow will be treated in the PCEF and ensures that this is in accordance with the user's subscription profile.

The PGW 120 can provide connectivity between the UE 108 and one or more of the external networks 106. In the illustrative network architecture 100, the PGW 120 can be responsible for IP address allocation for the UE 108, as well as one or more of QoS enforcement and flow-based charging, e.g., according to rules from the PCRF 118. The PGW 120 is also typically responsible for filtering downlink user IP packets into the different QoS-based bearers. In at least some embodiments, such filtering can be performed based on traffic flow templates. The PGW 120 can also perform QoS enforcement, e.g., for guaranteed bit rate bearers. The PGW 120 also serves as a mobility anchor for interworking with non-3GPP technologies such as CDMA2000.

Within the access network 102 and the core network 104 there may be various bearer paths/interfaces, e.g., represented by solid lines 122 and 124. Some of the bearer paths can be referred to by a specific label. For example, the solid line 122 can be considered an S1-U bearer and the solid line 126 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 104 can include various signaling bearer paths/interfaces, e.g., control plane paths/interfaces represented by dashed lines 124, 128, 130 and 132. Some of the signaling bearer paths may be referred to by a specific label. For example, the dashed line 124 can be considered as an S1-MME signaling bearer, the dashed line 128 can be considered as an S11 signaling bearer and the dashed line 130 can be considered as an Sha signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 170. In the illustrative example, the S1-U+ user plane interface extends between the eNB 110a and the PGW 120. Notably, the S1-U+ path/interface does not include the SGW 114, a node that is otherwise instrumental in configuring and/or managing packet forwarding between the eNB 110a and one or more of the external networks 106 by way of the PGW 120. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 114, 120 due to excessive handover events.

In some embodiments, the PGW 120 is coupled to a storage device 180, shown in phantom. The storage device 180 can be integral to one of the network nodes, such as the PGW 120, for example, in the form of internal memory and/or disk drive. It is understood that the storage device 180 can include registers suitable for storing address values. Alternatively or in addition, the storage device 180 can be separate from the PGW 120, for example, as an external hard drive, a flash drive, and/or network storage.

The storage device 180 selectively stores one or more values relevant to the forwarding of packet data. For example, the storage device 180 can store identities and/or addresses of network entities, such as any of the network nodes 112, 112, 116, 118, 120, the eNBs 110 and/or the UE 108. In the illustrative example, the storage device 180 includes a first storage location 182 and a second storage location 184. The first storage location 182 can be dedicated to storing a Currently Used Downlink address value 182. Likewise, the second storage location 184 can be dedicated to storing a Default Downlink Forwarding address value 184. The PGW 120 can read and/or write values into either of the storage locations 192, 184, for example, managing the Currently Used Downlink Forwarding address value 182 and the Default Downlink Forwarding address value 184 as disclosed herein.

In some embodiments, the Default Downlink Forwarding address" for each EPS bearer is the SGW S5-U address for each EPS Bearer. The Currently Used Downlink Forwarding address" for each EPS bearer in the PGW 120 can be set every time when the PGW 120 receives an uplink packet, e.g., a GTP-U uplink packet, with a new source address for a corresponding EPS bearer. When a UE 108 is in an idle state, the "Current Used Downlink Forwarding address" field for each EPS bearer of the UE 108 can be set to a "null" or other suitable value.

In some embodiments, the Default Downlink Forwarding address is only updated when the PGW 120 receives a new SGW S5-U address in a predetermined message or messages. For example, the Default Downlink Forwarding address is only updated wen the PGW 120 receives one of a Create Session Request, Modify Bearer Request and Create Bearer Response messages from the SGW 114.

As the values 182, 184 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that the access network 102 and the core network 104 are illustrated in a simplified block diagram in FIG. 1. In other words, either or both of the access network 102 and the core network 104 can include additional network elements that are not shown, such as various routers, switches and controllers. In addition, although FIG. 1 illustrates only a single one of each of the various network elements, it should be noted that the access network 102 and the core network 104 can include any number of the various network elements. For example, the core network 104 can include a pool (i.e., more than one) of MMEs 112, SGWs 114 or PGWs 120.

In the illustrative example, data traversing a network path between the UE 108, the eNB 110a, the SGW 114, the PGW 120 and the external network 106 may be considered to constitute data transferred according to an end-to-end IP service. However, for the present disclosure, to properly perform establishment management in the LTE-EPS network architecture 100, the core network, data bearer portion of the end-to-end IP service is analyzed.

An establishment may be defined herein as a connection set up request between any two elements within the LTE-EPS network architecture 100. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 134) between the UE 108 and the eNB 110a, a second portion (e.g., an S1 data bearer 122) between the eNB 110a and the SGW 114, and a third portion (e.g., an S5/S8 bearer 126) between the SGW 114 and the PGW 120. Various signaling bearer portions are also illustrated in FIG. 1. For example, a first signaling portion (e.g., a signaling radio bearer 136) between the UE 108 and the eNB 110a, and a second signaling portion (e.g., an S1 signaling bearer 124) between the eNB 110a and the MME 112.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of the network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of a first tunnel solution 160 includes a first tunnel 162a between two tunnel endpoints 164a and 166a, and a second tunnel 162b between two tunnel endpoints 164b and 166b. In the illustrative example, the first tunnel 162a is established between the eNB 110a and the SGW 114. Accordingly, the first tunnel 162a includes a first tunnel endpoint 164a corresponding to an S1-U address of the eNB 110a (referred to herein as the eNB S1-U address), and a second tunnel endpoint 166a corresponding to an S1-U address of the SGW 114 (referred to herein as the SGW S1-U address). Likewise, the second tunnel 162b includes a first tunnel endpoint 164b corresponding to an S5-U address of the SGW 114 (referred to herein as the SGW S5-U address), and a second tunnel endpoint 166b corresponding to an S5-U address of the PGW 120 (referred to herein as the PGW S5-U address).

In at least some embodiments, the first tunnel solution 160 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of a second tunnel solution 150 includes a single or direct tunnel 152 between tunnel endpoints 154 and 156. In the illustrative example, the direct tunnel 152 is established between the eNB 110a and the PGW 120, without subjecting packet transfers to processing related to the SGW 114. Accordingly, the direct tunnel 152 includes a first tunnel endpoint 154 corresponding to the eNB S1-U address, and a second tunnel endpoint 156 corresponding to the PGW S5-U address. Packet data received at either end can be encapsulated into a payload and directed to the corresponding address of the other end of the tunnel. Such direct tunneling avoids processing, e.g., by the SGW 114 that would otherwise relay packets between the same two endpoints, e.g., according to a protocol, such as the GTP-U protocol.

In some scenarios, a direct tunneling solution 150 can forward user plane data packets between the eNB 110*a* and the PGW 120, by way of the SGW 114. That is, the SGW 114 can serve a relay function, by relaying packets between the two tunnel endpoints 110*a*, 120. In other scenarios, the direct tunneling solution 150 can forward user data packets between the eNB 110*a* and the PGW 120, by way of the S1-U+ interface, thereby bypassing the SGW 114.

Generally, the UE 108 can have one or more bearers at any one time. The number and types of bearers can depend on applications, default requirements, and so on. It is understood that the techniques disclosed herein, including the configuration, management and use of various tunnel solutions 150, 160, can be applied to the bearers on an individual bases. That is, if user data packets of one bearer, say a bearer associated with a VoIP service of the UE 108, then the forwarding of all packets of that bearer are handled in a similar manner. Continuing with this example, the same UE 108 can have another bearer associated with it through the same eNB 110*a*. This other bearer, for example, can be associated with a relatively low rate data session forwarding user data packets through the core network 104 simultaneously with the first bearer. Likewise, the user data packets of the other bearer are also handled in a similar manner, without necessarily following a forwarding path or solution of the first bearer. Thus, one of the bearers may be forwarded through a direct tunnel 150; whereas, another one of the bearers may be forwarded through a two-tunnel solution 160.

Figure 2A:
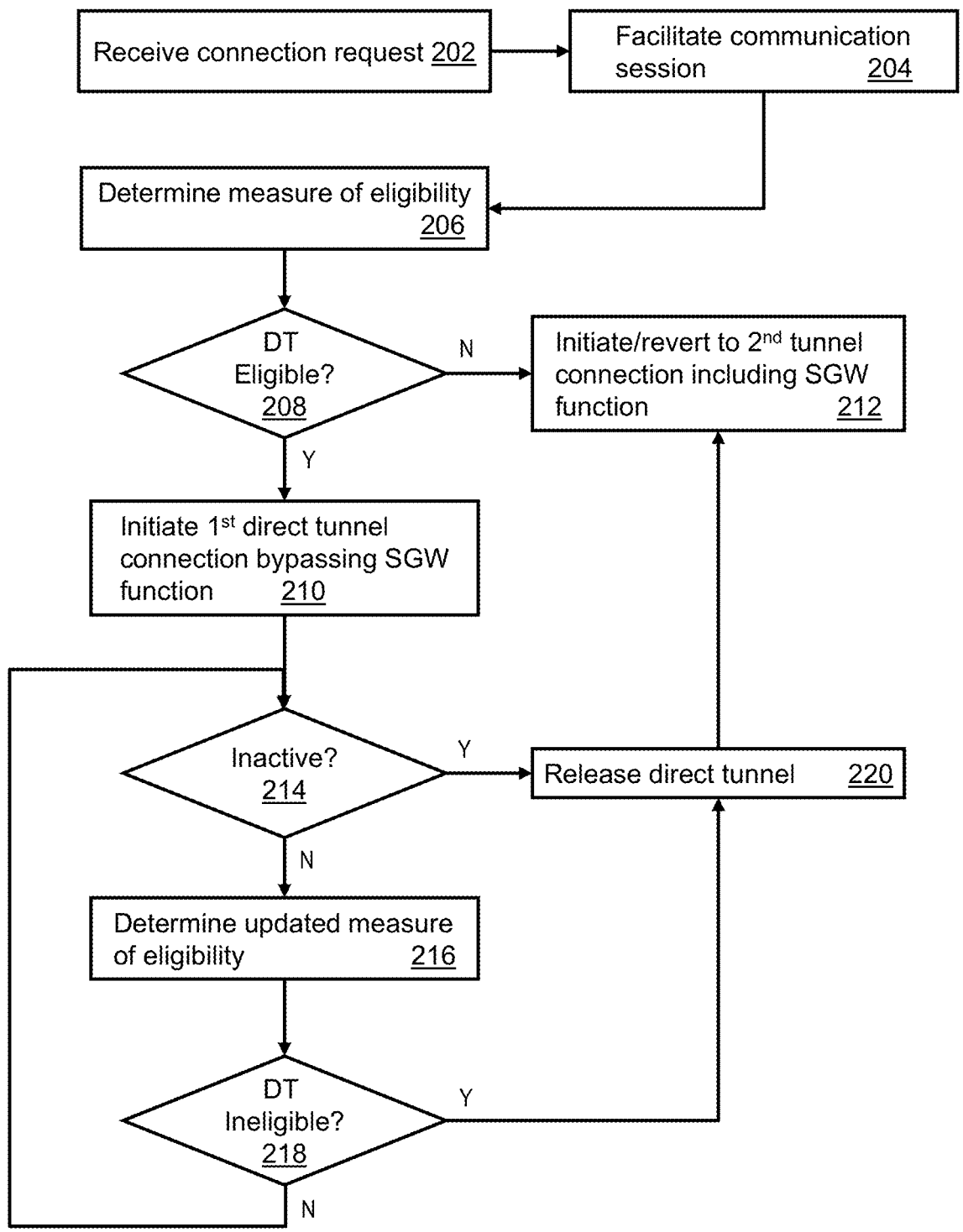
FIGS. 2A-2D depict illustrative embodiments of processes used in portions of the communication network described in FIG. 1.

FIG. 2A depicts an illustrative embodiment of a process 200A used in portions of the communication network described in FIG. 1. The process 200A includes receiving a connection request at 202. The connection request can be received by a network entity, such as an MME 112 (FIG. 1). The request can be for establishment of a network connection including a tunnel solution, e.g., a direct tunnel, between a wireless communication device, e.g., UE 108 (FIG. 1) and a packet data network, e.g., the Internet 140 (FIG. 1). A communication session, e.g., an IP session, is facilitated at 204. For example, the MME 112 facilitates a communication session between an eNB 110*a* in wireless communication with the wireless communication device and the packet data network. The facilitating of the network connection can include an exchange of control signaling between a second network device and a packet data network gateway, wherein the second network device includes a serving gateway function, and wherein the second network device, e.g., an SGW 114 (FIG. 1) operates in an evolved packet core network of a long term evolution system, e.g., network 100 (FIG. 1).

A measure of eligibility for the requested tunnel solution is determined at 206. Such a determination can be accomplished, e.g., by the MME 112. Eligibility can be determined according to various measures, such an identity of a subscriber, or equipment of a subscriber. Direct tunneling service can be offered, e.g., as a preferred service, which users may subscribe to for a fee. Other measures of eligibility can relate to mobility. Establishing eligibility according to mobility can be particularly useful for direct tunnel solutions that bypass a serving gateway function. As the serving gateway function supports mobility of user equipment, application of a direct tunnel connection could lead to complications and/or inefficiencies. For example, UE 108 mobility during a direct tunnel configuration may be possible, but may require additional overhead, e.g., signaling between network entities than would otherwise be required using the serving gateway function. Accordingly, to conserve network resources, e.g., bandwidth, processing availability and so forth, direct tunnels can be discouraged or blocked for requests that do not adhere to certain restrictions of mobility.

Some examples of measures of eligibility include, without limitation, one or more of an international mobile subscriber identity (IMSI) number series, an international mobile station equipment identity (IMEI) range, a list of access point names (APNs). An IMSI is generally used to identify a user of a cellular network and is a unique identification associated with all cellular networks. The IMEI is a number, usually unique, to identify user equipment, such as 3GPP (i.e., GSM, UMTS and LTE) and iDEN mobile phones, as well as some satellite phones. An APN can refer to a name of a gateway between a mobile network and another computer network, e.g., any of the external networks 106, such as the Internet 140.

Such eligibility measures as the IMSI number series, the IMEI range and/or the list of APNs can be preconfigured or otherwise stored in one or more of the network entities, such as the MME 112 (FIG. 1). As such parameters are discoverable by the MME 112 during the normal course of network operations, the MME 112 can compare one or more of such values to any preconfigured values to determine eligibility. Any measures of eligibility, such as the examples provided herein, can be used alone or in combination with each other, and/or in combination with other measures of eligibility, such as mobility triggers.

In general, the MME can control the usage of a direct-tunneling solution by one or more of IMSI number series, IMEI ranges, APN lists, local breakout policy for roamers, or mobility triggers, alone or in combination. By way of illustrative example, the MME 112 can use at least the following criteria to establish and release direct tunnels:
- an IMSI Number Series configured in the MMEs;
- an IMEI Range configured in the MMEs;
- a direct-tunnel-allowed APN list configured in the MMEs;
- a combination of the IMSI number series and the direct-tunnel-allowed APN list;
- a combination of the IMEI range and the direct-tunnel-allowed APN list;
- a combination of the IMSI number series and the IMEI range;
- a combination of the IMSI number series, the IMEI range and the direct-tunnel-allowed APN list;
- a combination of the IMSI number series, the direct-tunnel-allowed APN list, and a mobility trigger;
- a combination of the IMEI range, the direct-tunnel-allowed APN list, and a mobility trigger;
- a combination of the IMSI number series, the IMEI range, and the mobility trigger; and
- a combination of the IMSI number series, the IMEI range, the direct-tunnel-allowed APN list, and the mobility trigger.

Alternatively or in addition, measure of eligibility for the requested tunnel solution determined at 206 can depend on one or more other configuration options. By way of non-limiting example, a roaming scenario can offer the following configuration options: (i) direct tunnels are not allowed, (ii) direct tunnels are allowed for local breakout (LBO) only, (iii) direct tunnels are allowed for home routed (HR) only, or (iv) direct tunnels are always allowed.

For inbound roamers, when a local breakout is allowed, then the UE 108 and its corresponding local breakout APN may be eligible for direct-tunnel solutions in the serving network according to the techniques disclosed herein. For the inbound roaming case, the LTE direct tunneling architecture can support a scenario in which a home-routed (HR) PDN connection is requested by a roamer in a visited network and the roamer's home PGW indicates support of direct tunneling back to the visited network (via DTI, etc.). The visited network can use that information and local configuration/policy to determine whether or not to setup a direct tunnel for that roamer with a HR PDN connection request.

A determination is made at 208 as to eligibility related to the requested tunnel solution. To the extent the requested tunnel solution is eligible for a direct tunnel, a first direct tunnel connection is established at 210, bypassing the serving gateway function. To the extent that the requested tunnel solution is ineligible for the direct tunnel, an alternative or second tunnel connection, such as a two-tunnel, e.g., GTP, tunnel connection is established at 212. In particular, the second tunnel connection includes the serving gateway function, e.g., by passing through the SGW 114 network entity and being subjected to processing by the SGW 114.

While operating according to the direct tunnel solution, operations of the mobile communications device are monitored to determine periods of activity and/or inactivity. To the extent that the activity falls below some predetermined threshold, e.g., measured in minutes or hours, it can be concluded at 214 that the mobile communications device is inactive. To the extent that the mobile communications device having previously established a direct tunnel connection is inactive, the direct tunnel is released at 220 and a secondary, e.g., two-tunnel, solution is established at 212 including the serving gateway function.

To the extent the mobile communications device having previously established a direct tunnel is not inactive, as concluded at 214, an updated measure of eligibility is determined at 216. The updated measure of eligibility can include a mobility trigger as discussed herein. A determination is made at 218 as to continued eligibility related to the requested tunnel solution. To the extent that the determination concludes ineligibility, the direct tunnel is released at 220 and a secondary, e.g., two-tunnel, solution is established at 212 including the serving gateway function. To the extent, however, that the determination concludes not ineligible, the process continues to periodically monitor activity and eligibility according to 214-218 as disclosed above.

Mobility triggers can include a measure of handover events, e.g., X2 and/or S1-type handovers associated with mobility in an active mode. Such triggers can depend upon a measure of such handover events, e.g., within a predetermined time period, and comparing the measured results to a mobility trigger threshold. Such a mobility trigger threshold can be defined as a number of handover events per hour. Alternatively or in addition, mobility in an idle-mode can be measured, e.g., according to tracking area updates (TAUs) as might be monitored. The measurement can be performed, e.g., within a predetermined time period, and the results compared to an idle-mode mobility trigger threshold, e.g., T events/hour. An example of an MME configured to provide the logic implementing such mobility triggers is described below.

If a measure of TAU events, e.g., a quantity, rate and/or average, for a UE in an idle state exceeds a threshold, T, events per hour, the operator can be provided with an option to either allow or disallow the UE to establish any direct-tunnels for its packet data network connections when it is transitioned from the idle state to the active state, regardless of the MME configured direct-tunnel criteria, e.g., based on the IMSI, IMEI and APN list. In at least some embodiments, a "null" value or suitable override indicator can be provided as a selectable and/or configurable option for the operator. The override indicator indicates, e.g., that no action should be taken regardless of the "T" value.

If a measure of handover events, e.g., a quantity, rate and/or average, for a UE in the active state exceeds the threshold, HO, of events per hour, the operator can be provided with an option that either triggers or does not trigger the UE packet data network connections in a direct-tunnel mode to fall back to a 2-tunnel mode, regardless of the MME configured direct-tunnel criteria, e.g., based on the IMSI, IMEI and APN list. In at least some embodiments, a "null" value or suitable override indicator can be provided as a selectable and/or configurable option for the operator. The override indicator indicates, e.g., that no action should be taken regardless of the measured "HO" value.

In some embodiments, an opposite logic is provided for a TAU trigger such that responsive to a measure of TAU events for a UE in the idle state that is below the T events per hour, e.g., for some configurable duration, the operator can be provided with an option to either allow or disallow the UE to establish direct tunnels for its packet data network connections when it is transitioned from the idle state to the active state, despite MME configured direct-tunnel criteria based on one or more of the IMSI, IMEI and APN list. Once again, in at least some embodiments, a "null" value or suitable override indicator can be provided as a selectable and/or configurable option for the operator. The override indicator indicates, e.g., that no action should be taken regardless of the measured "T" value.

In some embodiments, an opposite logic is provided for an active mode handover trigger. Thus, if a measure of active mode handover events, e.g., X2 and/or S1 handovers, for a UE in the active state is below a threshold of HO events per hour, e.g., for some configurable duration, the operator can be provided with an option that either triggers or does not trigger the UE packet data network connections in the 2-tunnel mode to be promoted to a direct-tunnel mode, despite MME configured direct tunnel criteria, e.g., based on one or more of the IMSI, IMEI and APN list. In at least some embodiments, a "null" value or suitable override indicator can be provided as a selectable and/or configurable option for the operator. The override indicator indicates, e.g., that no action should be taken regardless of the measured "HO" value In at least some embodiments, one or more measures of mobility can be reset in response to one or more events. For example, the MME can reset one or more mobility event counters to "0" in response to, e.g., a UE state transition from an EPS connection management "ECM_Connected" state to an EPS mobility management "EMM_Idle" state and/or registers with the MME initially during an attach procedure and/or during an IRAT TAU and/or during an inter-MME procedure. Accordingly, a frequency of mobility events can be evaluated from a clean starting point. In at least some embodiments, a default action is "direct tunnel may trigger" when the UE is in the idle state after all counters are reset to "0" and one of the IMSI and/or IMEI and/or APN list criteria for direct tunnel are met.

In at least some embodiments, mobility triggers, such as the example triggers disclosed herein, can be used in a combined manner. For example, if a UE exceeds the T (TAU) events per hour in a measurement period during an idle mode, the UE will not be eligible for direct tunnel configuration when the UE initially transitions from idle to active. But during the active period, if the measured handover events (e.g., combined X2 and S1 handover events) events are less than the HO trigger threshold (handovers) per hour, then direct-tunnel promotion can be triggered during the active state. Also, if at some time later the mobility events (e.g., handovers) exceed the HO threshold, the UE is transitions to the 2-tunnel solution. However, immediately after the UE is transitioned back to idle mode, the default setting will take effective immediately, e.g., direct tunnel, can trigger, if one of the IMSI and/or IMEI and/or APN list criteria for 4G-DT is met.

Figure 2B:
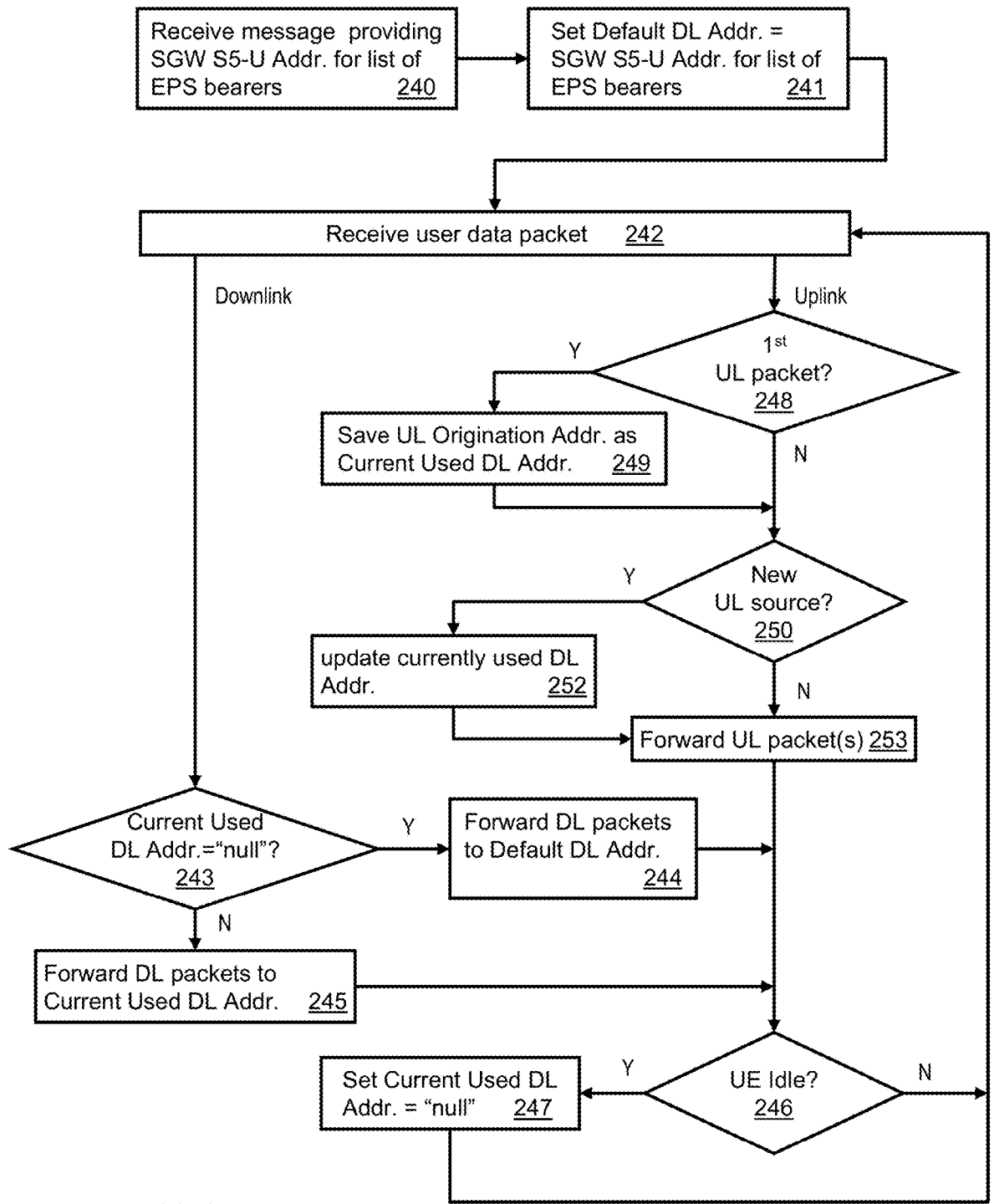

FIG. 2B depicts an illustrative embodiment of a user packet forwarding process implemented by the PGW 120. The PGW 120, at 240, receives a message providing the SGW S5-U address for a list of EPS bearers associated with the UE 108. The PGW 120, at 241, sets the Default Downlink address value 184 as the SGW S5-U address for the list of EPS bearers.

At 242, the PGW 120 receives a user packet. To the extent it is a downlink packet, i.e., directed from the PDN towards the UE 108, the PGW 120, at 243, determines whether the Currently Used Downlink address value 182 is "null." The term "null" as used herein can include an actual null value, some other dedicated value indicative of a null value, and/or an address out of a particular range of acceptable addresses. To the extent the Currently Used Downlink address is not "null", i.e., it is a valid address value, the PGW 120, at 245, forwards downlink packet(s) according to the Currently Used Downlink forwarding address value 182. However, to the extent that the Currently Used Downlink address is "null", the PGW 120, at 244, forwards downlink packet(s) according to the Default Downlink forwarding address value 184.

In some embodiments, the PGW 120 can determine, at 246, whether the UE 108 has entered an idle state. To the extent that the UE 108 has entered the idle state, the PGW 120 sets the Currently Used Downlink Forwarding address value 182 to "null". To the extent that the UE 108 has not entered the idle state, a subsequent user data packet is received at 242. If it is a downlink packet, the process continues according to 243-247. If, however, it is an uplink packet, the PGW 120, at 248, determines whether the packet represents a first uplink packet. To the extent it does, the PGW 120 saves the origination address of the uplink user data packet as the Currently Used Downlink Forwarding address value 182. In either event, the PGW 120 next determines, at 250, whether the origination address of the uplink packet represents a new uplink source. To the extent it does, the PGW 120, at 252, updates the Currently Used Downlink Forwarding address value 182. In either instance, the PGW 120, at 253, forwards the uplink packet accordingly.

Once again, if the PGW 120 determines, at 246, that the UE 108 has entered an idle state, the PGW 120 sets the Currently Used Downlink Forwarding address value 182 to "null." In either event, the process continues from 242, unless another message is provided, e.g., at 240. Examples of such messages include Create Session Request, Modify Bearer Request, and Create Bearer Response, which would be received from the SGW 114.

An uplink user packet is received by the PGW 120 at 250. The PGW 120, at 252, determines whether the receive uplink user packet is a first uplink user packet. To the extent it is a first uplink user packet, the PGW 120, at 256, saves an origination address of the first uplink user packet as the Currently Used Downlink address value 182, and forward the packet towards its PDN destination at 254. Otherwise, the PGW 120, at 254, forwards the uplink user packet towards its PDN destination without saving its origination address.

Figure 2C:
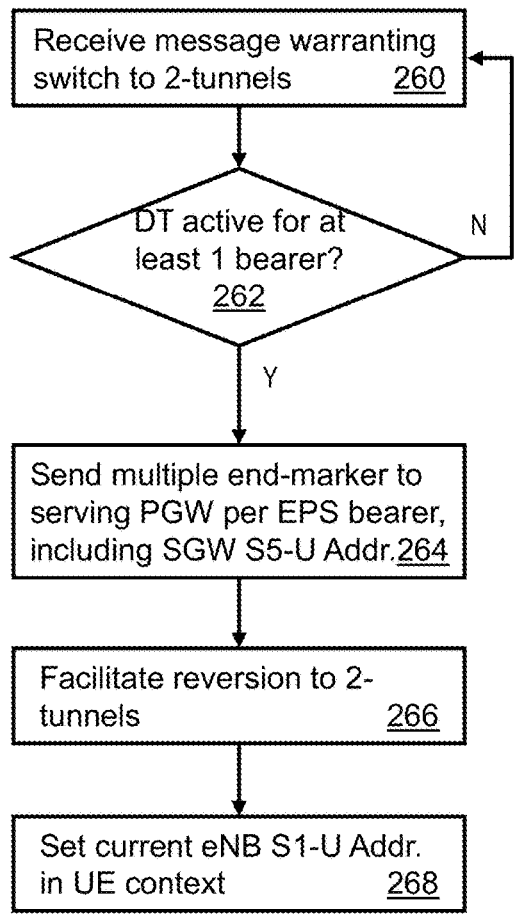

FIG. 2C depicts an illustrative embodiment of a user packet forwarding process implemented by the SGW 114. The SGW 114, at 260, receives a message warranting a switch to a two-tunnel solution. The SGW 114 determines, at 262, whether the direct tunnel is active, i.e., the Direct Tunnel Indicator (DTI) set to a "true" value. If it is not active, the SGW 114 repeats the process from 260. To the extent that the DTI is active, the SGW 114, at 264, sends multiple end-marker messages to each serving PGW 120 on a per EPS bearer bass. The message includes the SGW S5-U address. The SGW 114, at 266, facilitates reversion to a two-tunnel solution and sets a current eNB S1-U address, at 268, in association with the UE context.

Figure 2D:
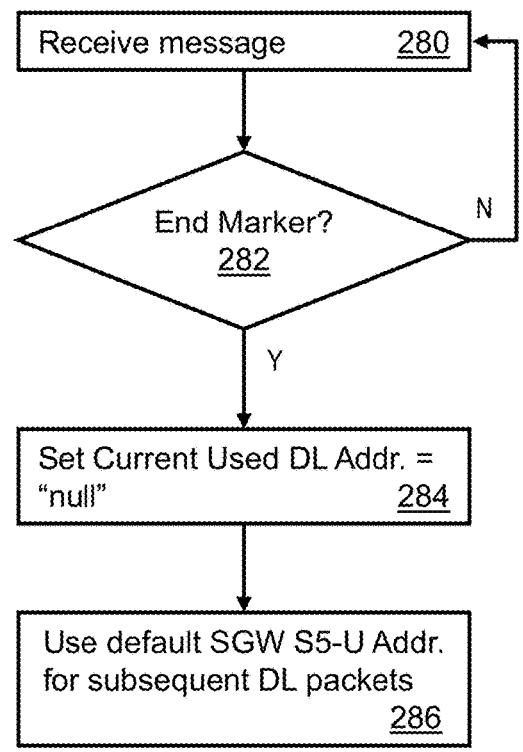

FIG. 2D depicts an illustrative embodiment of another user packet forwarding process implemented by the PGW 120. In the illustrative example, the PGW 120 receives a message at 280. The PGW 120 determines, at 282, whether the message is an end-marker message. To the extent the message is not an end-marker message, the process continues from 260. To the extent that it is an end-marker message, however, the PGW 120 sets the Currently Used Downlink Forwarding address to "null" and uses the default SGW S5-U address for forwarding any subsequent downlink packets.

Figure 3A:
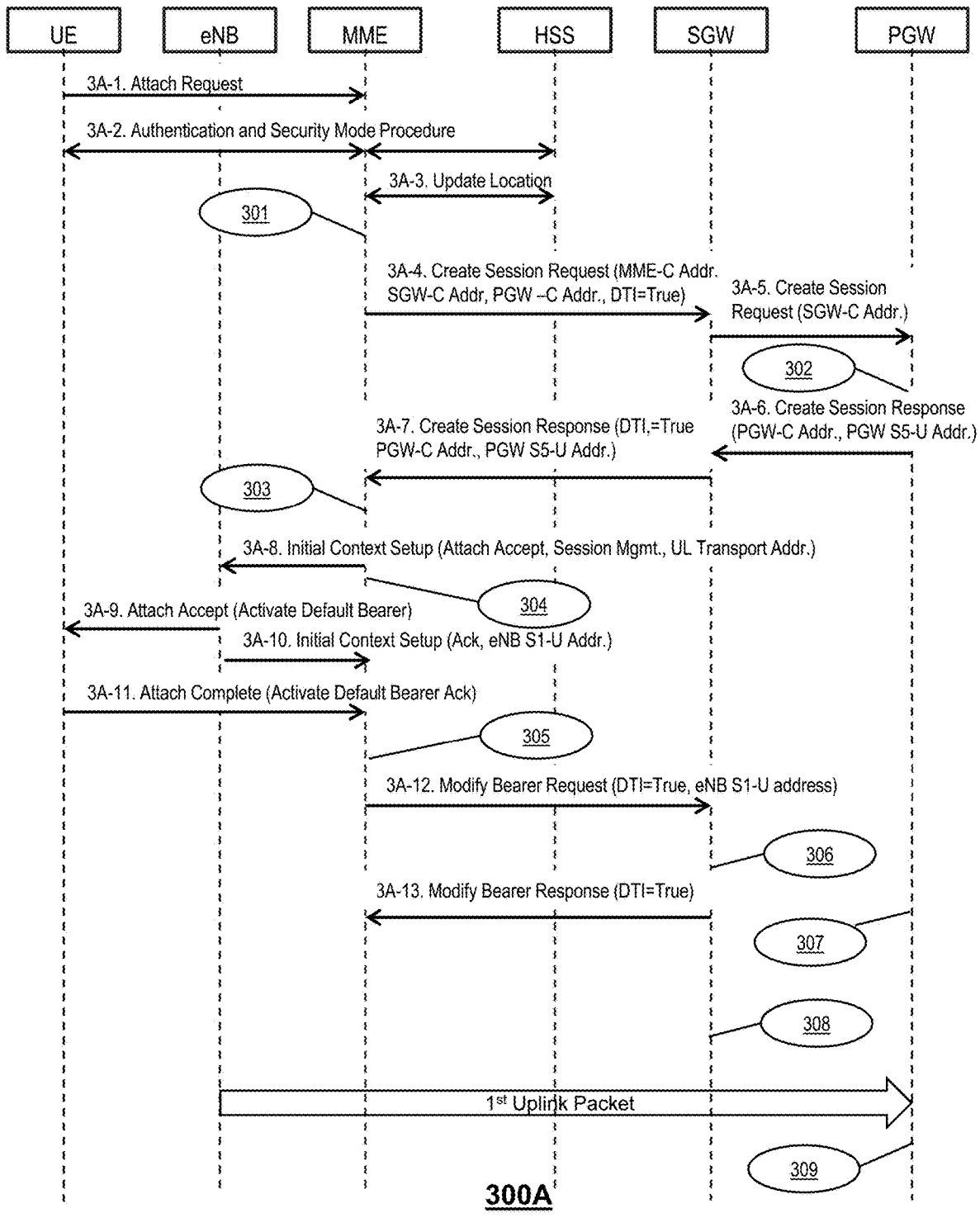
FIGS. 3A-3K depict illustrative embodiments of signaling diagrams related to the exchange packet-oriented information.

FIG. 3A-3K depict illustrative embodiments of signaling diagrams to exchange packet-oriented information. In particular, FIG. 3A illustrates an embodiment of a high-level call flow associated with a UE attach process. In the illustrative example, the UE 108 (FIG. 1) sends an attach-request message to the MME 112 at step 3A-1. At step 3A-2, the UE 108, the MME 112 and the HSS 116 engage in an authentication procedure and security mode procedure. At step 3A-3, the MME 112 engages an update location procedure in cooperation with the HSS 116. At 301, the MME 112 facilitates an analysis, e.g., based on locally configured direct-tunnel criteria and/or policies to determine whether the user, e.g., a subscriber associated with the UE 108, is eligible for direct-tunnel services and whether the APN associated with the attach-request message is eligible for direct-tunnel services. Reference to the phrase direct-tunnel or direct tunnel as used herein refers to tunneling configurations, services and so-forth that allow user data packets, e.g., in a user or data plane, to bypass the mobility anchor, namely, the SGW 114. Thus, user data packets can be routed in a direct sense between the eNB 110a and the PGW 120, without being subjected to any processing, even relay processing, at the SGW 114.

Each SGW 114 is generally associated with one or more eNBs 110, either directly (S1 interface) or indirectly according to a mesh network by way of an intervening eNB 110 (a combination of S1 and X2 interfaces). A set of SGW 114 and MME 112 nodes can serve a common area called an MME-SGW pool. Thus, UEs 108 in a cell controlled by one eNB 110a can be shared between multiple core network nodes.

To the extent that direct-tunnel service is not allowed, the attach process will not progress beyond 301. In the scenario presented in the illustrative example, it is assumed that the subscription allows for direct-tunnel services. Next, at step 3A-4, the MME 112 sends a create-session-request message to the selected SGW 114, indicating that a direct-tunnel solution is being applied in response to the attach request message. Such indications that a direct-tunnel is being applied can include identification of a direct-tunnel indicator (DTI), e.g., a bit or bit sequence, a variable, or a setting of some other suitable indicator or flag indicating a "true" value associated with the direct tunnel. The create-session-request message also identifies the MME-C address, the SGW-C address and the PGW-C address.

It is understood that error recovery rules, e.g., GTP error recover rules, as may be related to the direct-tunnel can be applied. The SGW 114 can allocate its S5-U address towards the PGW 120, which can be used for situations in which a direct-tunnel setup is not successful in the PGW 120, allowing for reversion to a so-called two-tunnel solution, e.g., once again routing user plane, e.g., user data, packets through the SGW 114. At step 3A-5, the SGW 114 sends a create session request to the PGW 120. The create session request includes the SGW-C address and the SGW S5-U address of the SGW 114.

At 302, The PGW 120 sets a "Default Downlink User-Plane" address to a value of the SGW S5-U address for each EPS bearer in a list of EPS bearers. At this moment, the "Currently Used Downlink User Plane" address is a null value.

Presuming that the PGW 120 facilitates a direct-tunnel configuration successfully, the PGW 120 responds at step 3A-6 by providing a create-session-response message including its PGW-C address and its PGW S5-U address for a list of EPS bearers. In response to receiving the create session response from the PGW 120, the SGW 114 sends a create-session-response message to the MME 112 at step 3A-7, including a DTI flag, or other suitable indication. The create-session-response message also includes the PGW-C address, the PGW S5-U address for a list of EPS bearers, the SGW-C address and the SGW S1-U address of the SGW 114. In the illustrative embodiment, the S1-U address of the SGW 114 remains allocated and can be used, e.g., when reverting to a backup tunnel or other data packet transfer solution, e.g., two-tunnel, solution that does not bypass the SGW 114.

After deciding to proceed with a direct-tunnel configuration at 303, the MME 112, at step 3A-8, sends an initial context-setup message to the eNB 110*a*. The initial context-setup message includes an indication that the attachment was accepted, information related to session management and UL transport addresses for the list of EPS bearers. At 301, the MME 112 decides to proceed with the direct tunnel setup and sends the PG S5-U address in the UL transport address field of the initial context setup request message 3A-8.

At step 3A-9, the eNB 110*a* forwards an attach-accept message to the UE 108. At step 3A-10, the eNB 110*a* acknowledges an initial context setup, with an acknowledgement indicator and the S1-U address of the eNB 110*a*.

The UE 108 sends an attach-complete message to the MME 112 at step 3A-11. At the stage, the PDN context records of the MME 112 should record the necessary information for both a direct-tunnel solution and an alternate solution, such as a two-tunnel solution. A PDP context is generally understood to represent a data structure present on both a serving support node and a gateway support node, which contains a subscriber's session information when the subscriber has an active session. The context can identify a PDN to be accessed. At 305, the MME 112 sets the tunnel status as direct-tunnel, and remembers or otherwise stores the S1-U address of the eNB 110*a* in step 3A-10, the SGW S1-U address and the PGW S5-U address received in step 3A-7.

The MME 112 sends a modify-bearer-request message to the SGW 114 at step 3A-12 to inform the SGW 114 that the direct-tunnel setup was successful in the eNB 110*a* (i.e., determined by the DTI flag) and the eNB S1-U address. At 306, the SGW 114 sets the tunnel status as direct-tunnel and stores, retains or otherwise remembers, e.g., in its UE Context: the current tunnel status (direct-tunnel vs. two-tunnels), the eNB S1-U address (step 3A-12), the SGW S1-U address (step 3A-7), the SGW S5-U address (step 3A-5) and the PGW S5-U address (step 3A-6).

Such retained address information can be used when falling back or otherwise reverting to an alternative, e.g., 2-tunnel, solution when necessary. The SGW 114, at step 3A-13, sends the modify-bearer-request message to the PGW 120, including a DTI flag indicating that a direct tunnel is being used by the eNB 110*a*. At 307, if the PGW 120 receives any downlink packet(s), it forwards the downlink packet(s) to the default downlink address, i.e., the SGW S5-U address, since the "currently used" downlink address is null at this moment. At 308, if the SGW 114 receives any downlink packets from the PGW 120, the SGW 114 uses the PGW S5-U address as the origination address when forwarding the downlink packet to the eNB 110*a*. At this point, the PGW 120 can initiate a direct tunnel for the transfer of user data packets with the eNB 110*a* after having received the eNB S1-U address and a DTI="True" flag.

At step 3A-13, the SGW 114 forwards the modify-bearer-response message to the MME 112. The SGW 114 can prepare for the direct-tunnel configuration, as it will no longer see any uplink traffic or downlink traffic at this moment. At this point, the eNB 110*a* can begin sending user data traffic, e.g., uplink traffic, directly to the PGW 120. Likewise, the PGW 120 can begin sending user traffic, e.g., downlink traffic, directly to the eNB 110*a*. User data now is directly flowing between the eNB 110*a* and the PGW 120 as indicated by the horizontal arrow, without having to be routed through the mobility anchor, e.g., the SGW 114.

At 307, the PGW 120 forwards any downlink packets to the Default Downlink address, i.e., the SGW S5-U address, since the Currently Used DL address is null at this moment. At 308, should the SGW 114 receive any downlink packet(s) from the PGW 120, the SGW 114 uses the PGW S5-U address as the origination address when forwarding the downlink packet(s) to the eNB 110*a*. After the PGW 120 receives a first uplink packet from the eNB 110*a*, the PGW saves the new origination address as the Currently Used Downlink address. At 309, the PGW 120 proceeds to send subsequent downlink packets to the Currently Used Downlink address.

Figure 3B:
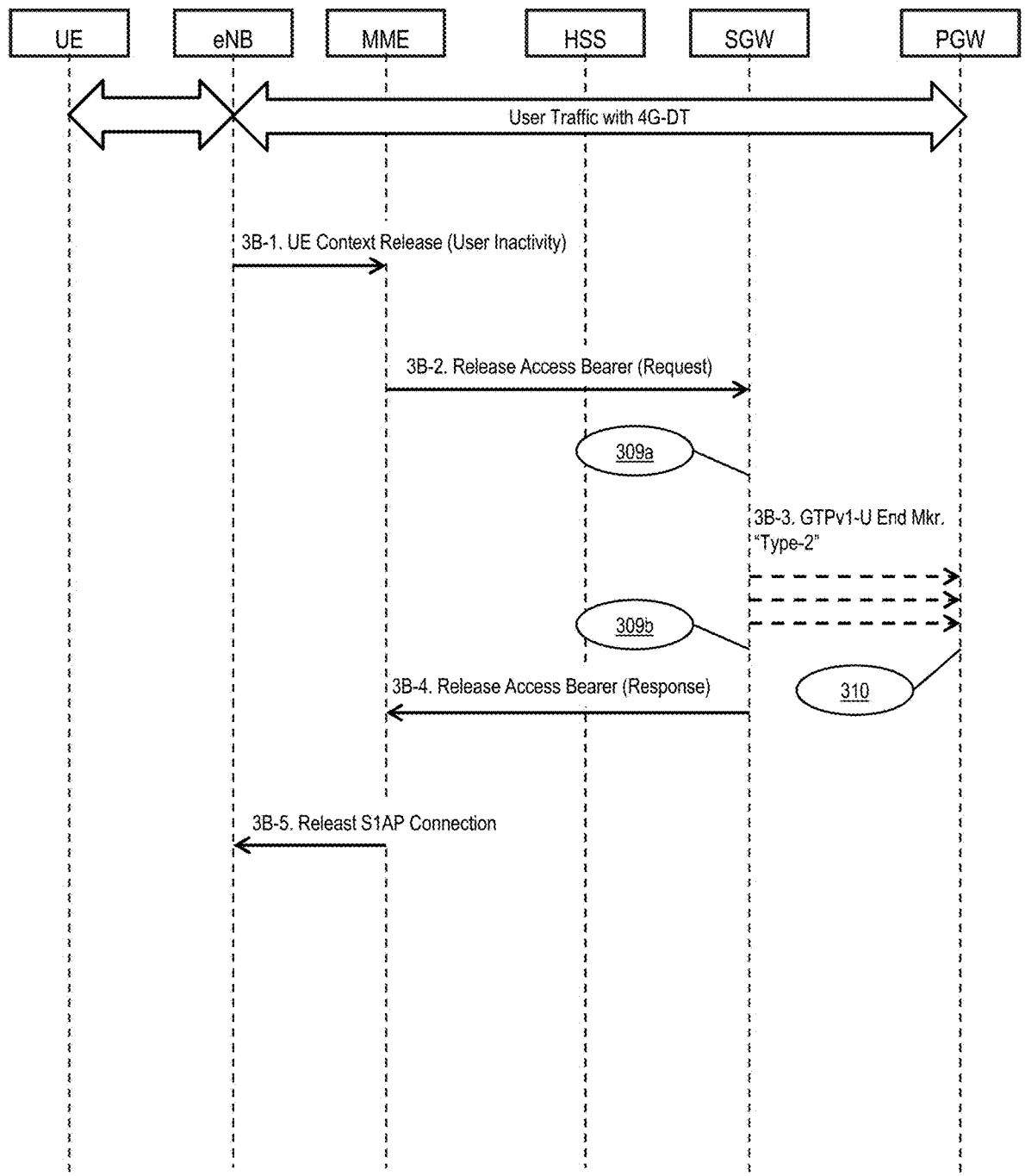

FIG. 3B illustrates an embodiment of a high-level call flow 300B associated with an S1-release in relation to a direct-tunnel configuration. Starting from a direct tunnel configuration in which packets are exchanged between the eNB 110*a* and the PGW 120, the eNB 110*a*, at step 3B-1, sends a UE context-release message. This message can be sent, for example, in response to user inactivity for time period greater than a predetermined threshold time period. At step 3B-2, the MME 112 sends release-access-bearer request message to the SGW 114. This message can include a direct tunnel release indication. At 309*a*, the SGW 114 first checks during release of the access bearer whether one of the UE PDN connections has a direct tunnel status indicator as "True." Upon an indication of a direct tunnel, the SGW 114, at step 3B-3, sends multiple, e.g., at least three, consecutive end-marker messages or packets to the serving PGW 120. The end-marker packets include the SGW S5-U address as a source address. This process can be repeated for each EPS bearer of a list of EPS bearers associated with the UE 108. After sending the end-marker packets, the SGW 114 can set a direct tunnel indicator to "false," for example, indicating a reversion to a two-tunnel solution.

The end-marker message is referred to as "GTPv1-U end-marker, Type-2." According to typical LTE core network terminology, end-marker messages are generally understood as being exchanged across the S1-U and X2 interfaces. Accordingly, the end-marker messages are exchanged between one of an SGW, an eNB or both. These messages generally indicate the end of a payload stream on a given tunnel. Any data packets that may happen to arrive after receiving an end-marker message on a particular tunnel can be discarded. The type-2 end-marker messages disclosed herein are exchanged between the SGW 114 and the PGW 120.

When the UE 108 is in the idle state, a Downlink Data Notification (DDN) message can be triggered by the SGW 114, for example, if there is user data from the PGW 120. The SGW 114 deletes the current eNB S1-U addresses in the UE context and puts the UE 108 in the idle state and completes a procedure to release the access bearer.

At 310, after receiving the end-marker, type-2 packets, the PGW 120 takes certain actions if the source address of the packets is the same as the saved Default Downlink SGW S5-U address. Namely, the PGW 120 (i) cleans up, resets or otherwise erases the Currently Used Downlink address field, (ii) sets the currently used downlink address field as "null" and (iii) starts to use the default SGW S5-U address for the forwarding of subsequently received downlink packets.

The SGW 114 sends a release access bearer response to the MME 112. This results in the tunnel status for the PDN context to revert to a two-tunnel solution. The SGW 114 also listens to its SGW S5-U address for the user data traffic from the saved PGW's S5-U address. The SGW 114 puts the UE 108 into an idle state. Then, it deletes the eNB S1-U address and acknowledges the MME 112 by sending the release-access-bearer-acknowledgment message to the MME 112, at step 3B-4, with an indication that the direct-tunnel is being released.

The MME 112 sets the tunnel status for the PDN context to "two-tunnels," deletes the eNB S1-U address and continues remembering the SGW S1-U address and the PGW S5-U address. The MME 112 puts the UE 108 into an idle state and sends the UE 108 context release command to the eNB 110a at step 3B-5.

In the UE 108 idle state, the MME 112 can store, retain or otherwise remember the SGW S1-U address and PGW S5-U address in the PDN Context. The SGW 114 can store, retain or otherwise remember the SGW S1-U address, the SGW S5-U address and the PGW S5-U address in the PDN Context. The PGW 120 can store, retain or otherwise remember the SGW S5-U address and the PGW S5-U address in the PDN Context. In general, the nodes associated with packet data connections are configured to store, retain or otherwise remember the tunnel status in the PDN contexts.

Figure 3C:
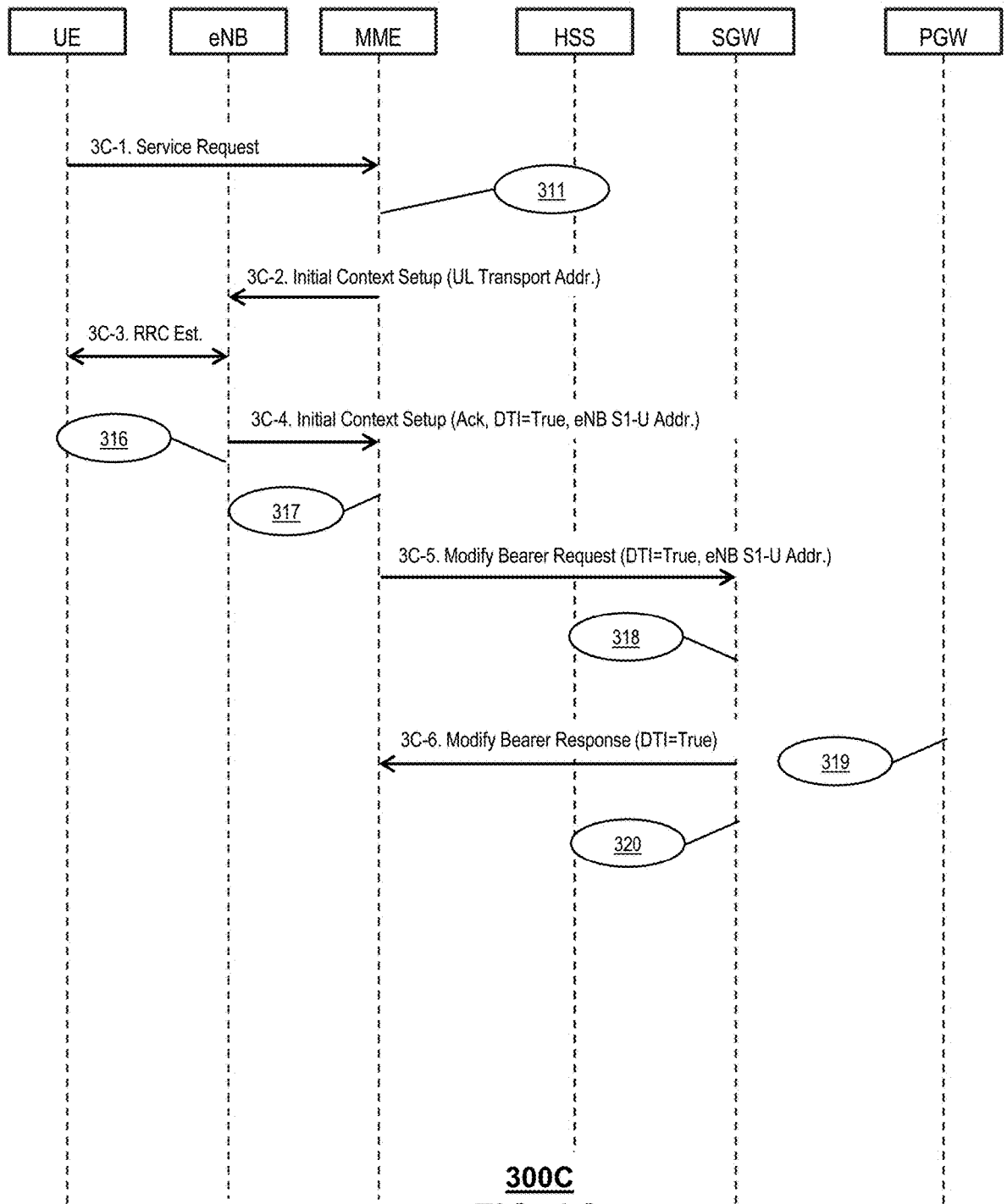

FIG. 3C illustrates an embodiment of a high level call flow service request 300C for a direct-tunnel configuration. At step 3C-1, the UE 108 having data to send and receive, sends a service-request message to the MME 112. The UE 108 indicates which PDN context has the data to transmit. At 311, the MME 112 verifies that the UE 108 and the requested APNs of the PDN context are eligible for direct tunnel service. For example, the MME 112 can conduct an analysis, e.g., based on direct-tunnel policies, to determine if the subscriber and the requested APN are eligible for direct-tunnel service. Presuming that the subscriber and requested APN are eligible for direct-tunnel service, the MME 112, at step 3C-2, sends the initial UE-context-setup-request message to the eNB 110a with the direct tunnel indication and the saved PGW S5-U address as an uplink transport address.

At step 3C-3, the eNB 110a sets up the RRC resource and data radio resources over the air. At step 3C-4, the eNB 110a acknowledges that the direct tunnel has been setup successfully, also providing a direct-tunnel indicator and the eNB S1-U address in the initial-UE-context-setup-acknowledgment message. At 316, it is possible that the eNB 110a can send the uplink user traffic to the PGW 120 at this stage. At 317, the MME 112 sets the current tunnel status as "direct tunnel" and remembers the eNB S1-U address in addition to the SGW S1-U address and the PGW S5-U address in each PDN context. At step 3C-5, the MME 112 sends a modify-bearer-request message with a direct-tunnel indication and the eNB S1-U address to the SGW 114 for the list of EPS bearers.

At 318, the SGW 114 sets the current tunnel status as "direct tunnel" and continues remembering the eNB S1-U address in step 3C-5, the SGW S1-U address and the SGW S5-U address and the PGW S5-U address for each EPS bearer. At step 3C-6, the SGW 114 forwards the modify-bearer-acknowledgment message to the MME 112. At 319, if the PGW 120 receives any downlink packets, it should forward them to the Default Downlink address, i.e., the SGW S5-U address, since the current used downlink address is "null" at this moment. After the direct tunnel indicator is received from the MME 112 at 320, the SGW 114 uses the PGW S5-U address as an origination address when forwarding to the eNB 110a any downlink packets received from the PGW 120. At this point, the eNB 110a can send uplink traffic directly to the PGW 120, without any relay through or processing by the SGW 114. Likewise, the PGW 120 can send downlink traffic directly to the eNB 110a.

At 320, after receiving a first uplink packet, the PGW 120 can save the new origination address as a Currently Used Downlink address. Then all subsequent downlink packets can be sent to the Currently Used Downlink address.

Figure 3D:
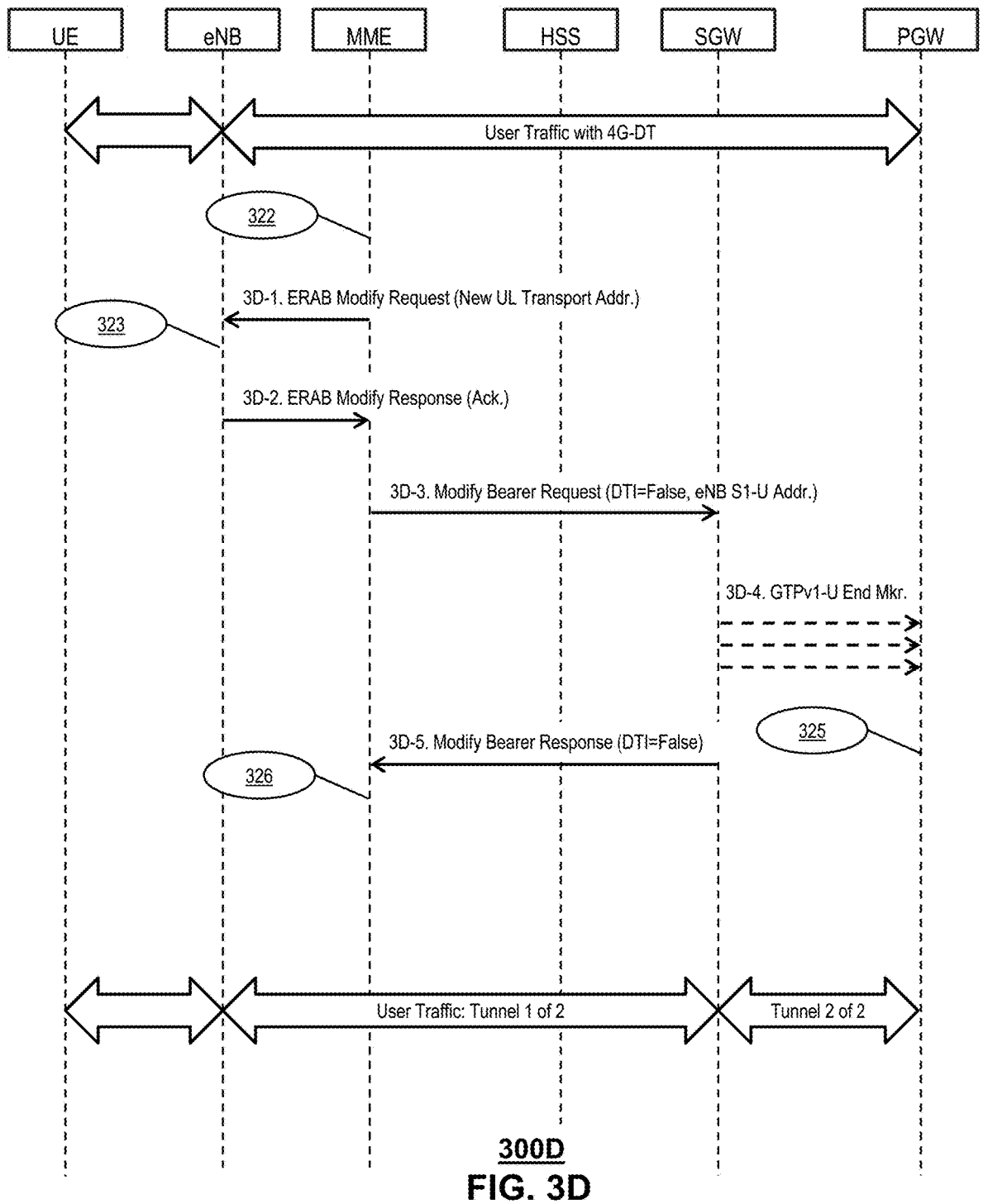

FIG. 3D illustrates an embodiment of a high level call flow 300D associated with a change from a direct tunnel to a two-tunnel configuration. Initially, uplink traffic is flowing directly from the eNB 110a to the PGW 120 and downlink traffic is flowing directly from the PGW 120 to the eNB 110a as indicated by the horizontal arrow between the eNB and the PGW headers. One of a high mobility event trigger, a policy change, or some combination thereof is received at 322. In response, the MME 112 determines that a two-tunnel solution should be used. The MME 112 retrieves the SGW S1-U address and eNB S1-U address in a saved PDN context.

At 3D-1, the MME 112 sends a EUTRAN Radio access bearers (ERAB) modify request, also providing a new uplink transport address. At 323, the eNB 110a modifies the transport configuration for the user traffic and begins to send the uplink traffic to the new uplink transport address, the SGW S1-U address. At this point, the eNB 110a should expect the downlink traffic from either the SGW 114 or the PGW 120. At 3D-2, the eNB 110a sends an ERAB-modify-response message to the MME 112 and acknowledges that the direct-tunnel configuration has been removed. The MME 112, in turn, sends a modify bearer request to the SGW 114 at 3D-3. The modify bearer request provides a false value for the direct tunnel indicator, along with the eNB S1-U address.

Receipt of the modify bearer request with the false direct tunnel indicator, indicates to the SGW that the direct tunnel (4GDT) should be terminated. At 3D-4, the SGW 114 first sends multiple, e.g., at least three, consecutive end-marker packets (e.g., GTPv1-U End-Marker, type-2 packets) to the serving PGW 120. An exchange of end-marker messages between the SGW 114 and the PGW 120 is accomplished on a per EPS Bearer basis. The end-marker packets can provide the SGW S5-U address as a source address. After sending the end-marker packets, the SGW 114 sets a direct tunnel indicator to false and reverts back to two-tunnel solutions. The SGW 114 proceeds to forward downlink and uplink user packets accordingly.

After receiving the end-marker type-2 packets, the PGW 120 at 325 cleans up the Currently Used Downlink address field, sets the Currently Used Downlink address as "null" and starts to use the default SGW S5-U address for subsequent downlink packets. These steps are accomplished if the source address of the packets is the same as the Saved Default Downlink SGW S5-U address.

At step 3D-5, the SGW 114 sends a modify-bearer-response message to the MME 112, with the acknowledgment of ending the direct tunnel configuration. As a result of this procedure, the user data flows through two tunnels (i.e., an S1-U tunnel between the eNB 110a and the SGW 114 and an S5-U tunnel between the SGW 114 and the PGW 120).

It is worth noting that after step 3D-2, the eNB 110a can send uplink traffic to the SGW 114. The SGW 114 forwards the user packets to the PGW 120 using the corresponding eNB S1-U address as the source address until it receives the modify bearer response at 3D-5 with a direct tunnel indicator set to a false value. After receiving the modify bearer response with the direct tunnel indicator set at the false value, the SGW 114 uses its corresponding SGW S5-U address as the source address when forwarding the subsequent UL packets. Situations in which the PGW 120 receives user packets from the SGW 114 before it receives the end-marker, type-2 message are handled as if there is a handover in the RAN and the PGW 120 just updates the Currently Used Downlink address field with this new source address (i.e., SGW S5-U address).

Figure 3E:
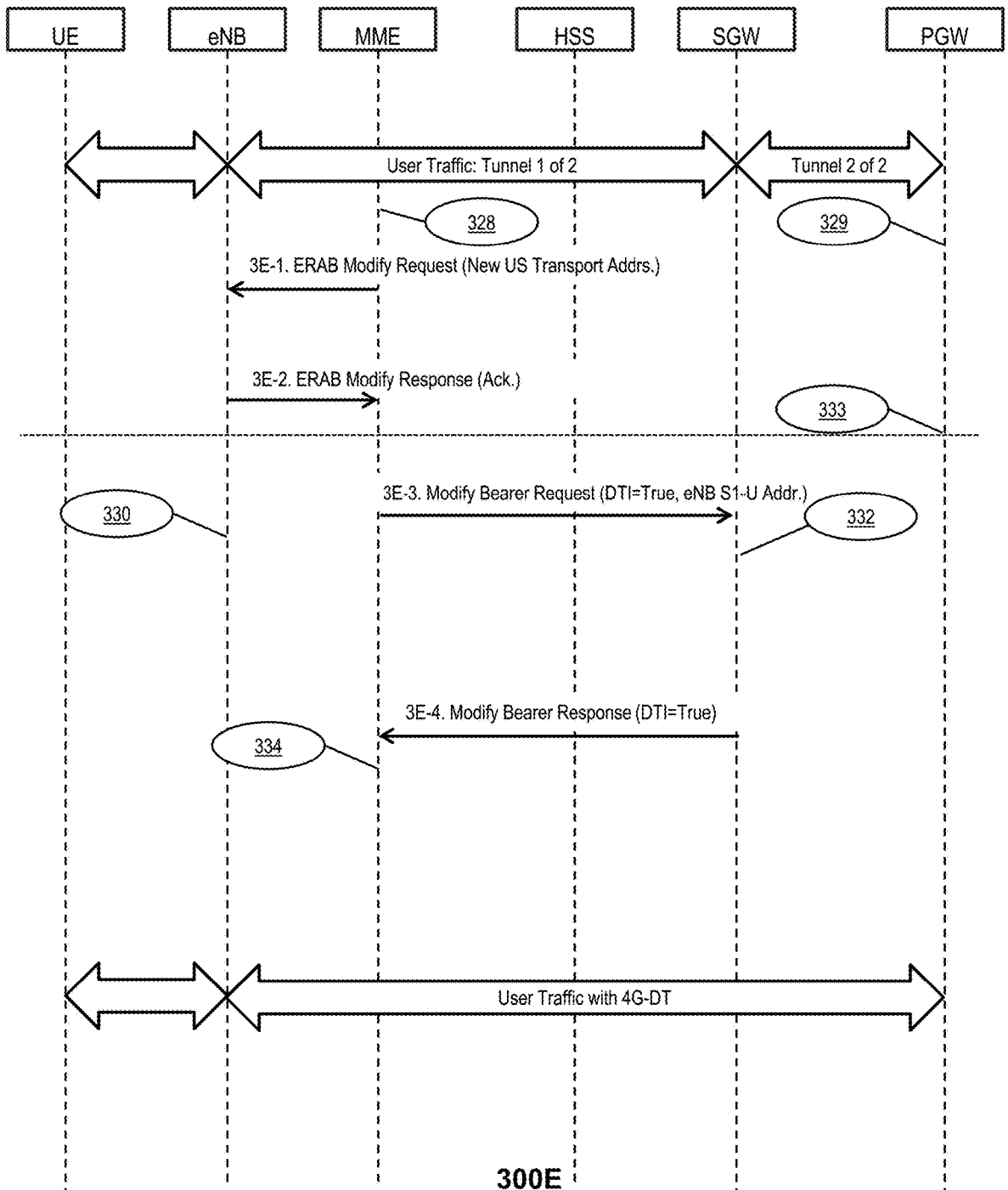

FIG. 3E illustrates an embodiment of a high-level call flow 300E associated with a change from a two-tunnel configuration to a direct tunnel configuration. Initially, user data flows through two tunnels, e.g., an S1-U tunnel between the eNB 110a and the SGW 114 and an S5-U tunnel between the SGW 114 and the PGW 120. The MME 112 receives an event trigger at 328. The MME 112, in response, determines that the direct-tunnel solution can be used at this time, and retrieves the PGW S5-U address and eNB S1-U address retained in a saved PDN context. At 329, the Default Downlink address and the Currently Used Downlink address at the PGW 120 are the same.

At step 3E-1, the MME 112 uses the ERAB-modification-procedure to send a message to the eNB 110a, with information indicating a new uplink transport address. The MME 112 receives an ERAB modify response acknowledgement from the eNB 110 at step 3E-2. The MME 112, at step 3E-3, uses a modify-bearer-request procedure to inform the SGW 114 that the direct tunnel should be used with the eNB S1-U address.

At 330, the eNB 110a modifies the transport configuration for the user traffic and begins to send the uplink traffic to the new uplink transport address, which at this point is the PGW S5-U address. At 332, the SGW 114 sets the current tunnel status as "direct tunnel" and remembers, stores or otherwise retains the eNB S1-U address, together with the SGW S1-U address, the SGW S5-U address and the PGW S5-U address. The SGW 114 continues forwarding packets from/to the PGW 120 if it still receives user packets. However, for uplink packets, the SGW 114 should use the eNB S1-U address as the source address. Likewise, tor downlink packets, the SGW 114 should use the PGW S5-U address as the source address.

After step 3E-2, the PGW 120 the PGW 120 at 333 begins receiving the uplink packets from the serving eNB 110a. After receiving the first uplink user packet is received and determining the source address is different from the Currently Used Downlink address, the PGW 120 should save this new origination address as the Currently Used Downlink address. Subsequent downlink packets should be sent to this Currently Used Downlink address.

At step 3E-4, the SGW 114 sends a modify bearer response to the MME 112, with direct tunnel indicator set to a "true" value. At 334, the MME 112, in turn, sets the current tunnel status as "direct tunnel", remembers, stores or otherwise retains the eNB S1-U address, in addition to the SGW S1-U address and the PGW S5-U address in the PDN context.

Figure 3F:
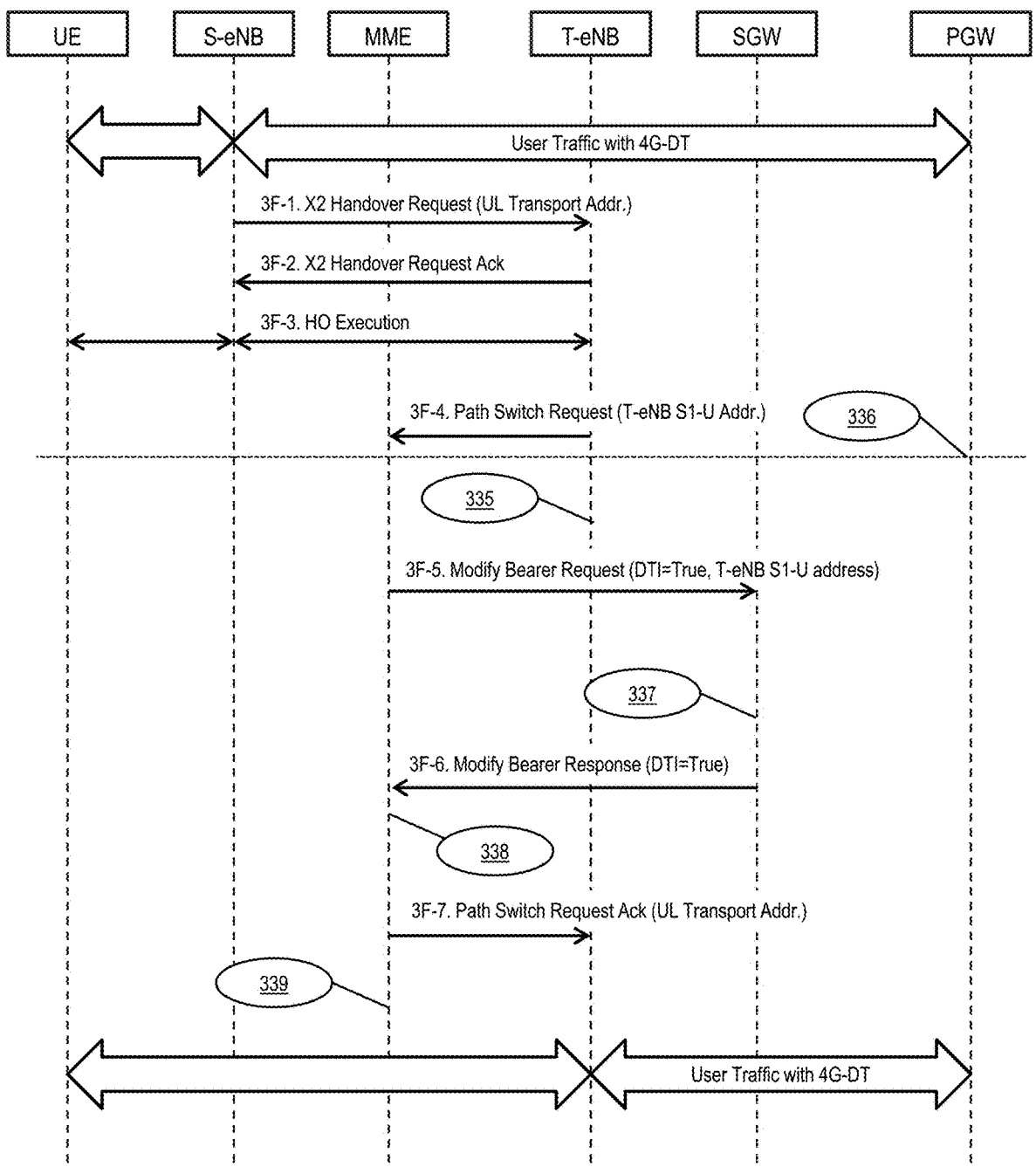

FIG. 3F illustrates an embodiment of a high-level call flow 300F associated with an X2 handover change under a direct tunnel configuration without change of an associated SGW 114. Initially, user data flows through a direct tunnel between a source eNB 110a (S-eNB) and the PGW 120. The S-eNB 110a detects that it is necessary to execute an X2 handover process to transition wireless connectivity associated with the UE 108 to a target eNB 110b (T-eNB). In response, the S-eNB 110a, at step 3F-1, sends an X2 handover request message to the T-eNB 110b. The X2 handover request message includes an uplink transport address, e.g., the PGW S5-U address.

After it allocates the necessary resources, the T-eNB 110b, at step 3F-2 sends a handover request acknowledgement message to the S-eNB 110a, responding to the X2-handover request and the direct-tunnel configuration. At step 3F-3, the system 100 executes an X2 handover process. Once the T-eNB 110b acquires the UE 108, it can start to forward the uplink traffic from UE 108 to the PGW 120 directly, since it already knows the uplink, e.g., PGW S5-U address. At step 3F-4, The T-eNB sends a path-switch-request message to the MME 112, indicating that the X2 handover process has completed and that the direct-tunnel configuration is being used on the T-eNB 110b and the target eNB S1-U address.

At 335, the target eNB 110b sends uplink traffic to the PGW S5-U address. The MME 112 continues marking the tunnel status as "direct-tunnel" and saves the new eNB S1-U address in an updated PDN context. The MME 112 decides that the SGW 114 does not need to be changed and sends a modify-bearer-request message to the corresponding SGW 114, at step 3F-5, with the direct-tunnel indication and the target eNB S1-U address. At 337, the SGW 114 saves the new, target eNB S1-U address and keeps the tunnel status as "direct-tunnel." At step 3F-6, the SGW 114 sends a modify-bearer-response message with the direct-tunnel indication to the MME 112. The SGW 114 is ready to operate in the direct-tunnel mode and sends a modify-bearer-response message, at step 3F 6, to the MME 112, with the direct-tunnel indication. At step 3F-7, the MME 112 acknowledges a path-switch-request message to the target eNB 110b, while maintaining the direct-tunnel indication. User traffic is transferred between the UE 108 and the PGW 120, by way of the T-eNB 110b as illustrated. At 339, the SGW 114 sets the current tunnel status as "direct tunnel" and saves the target eNB S1-U address in the PDN context.

At 336, the PGW 12 begins receiving the uplink packets from T-eNB 110*b* after Step 3F-4. After receiving the first uplink user packet from the target eNB 110*b* and determining that the source address is different from the Currently Used Downlink address, the PGW 120 save the new origination address as the new Currently Used Downlink address (i.e., replacing the old one from the source eNB 110*a*). Then all subsequent downlink packets are be sent to this new Currently Used Downlink address.

Figure 3G:
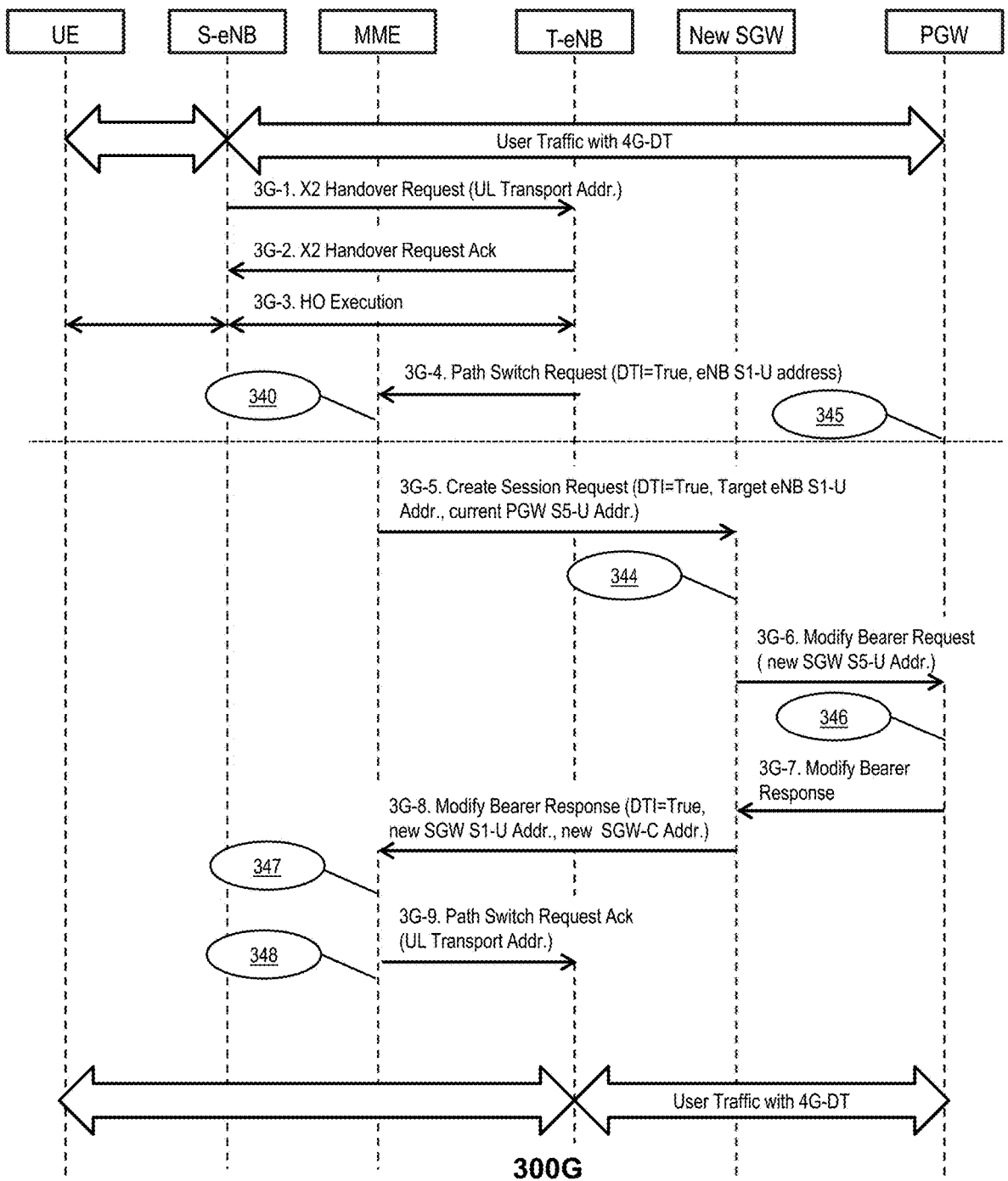

FIG. 3G illustrates an embodiment of a high-level call flow 300G associated with an X2 handover change under a direct tunnel configuration with a change of an associated serving gateway. Initially, user traffic transferred between the UE 108 and the PGW 120, by way of a source S-eNB 110*a* as illustrated, including a direct tunnel configuration between the S-eNB 110*a* and the PGW 120. The S-eNB 110*a* detects that it is necessary to execute an X2 handover procedure and sends an X2 handover request message to a target T-eNB 110*b* at step 3G-1. The handover request message includes an uplink transport address, e.g., a PGW S5-U address. After allocating the necessary resources, the T-eNB 110*b* sends a message to the S-eNB 110*a* at step 3G-2, acknowledging the X2 handover request message.

The X2 handover procedure is executed at step 3G-3. Once the T-eNB 110*b* acquires the UE 108, it can start to forward the uplink traffic from UE 108 to the PGW 120 directly at 342 by way of the direct-tunnel configuration, without being subjected to processing by the SGW 114, since the T-eNB 110*b* already knows the PGW S5-U address.

At step 3G-4, the T-eNB 110*b* sends a path-switch-request message to the MME 112, indicating that an X2 handover procedure has completed and that the direct-tunnel configuration is being used on the T-eNB 110*b*, and also providing the target eNB S1-U address. At 340, the MME 112 continues marking the tunnel status as "direct tunnel" and saves the new eNB S1-U address in a PDN context. In the illustrative example, the MME 112 decides that the current SGW 114 needs to be changed and, at step 3G-5, sends a create-session-request message to a new SGW (not shown in FIG. 1), with a direct tunnel indication and a new eNB S1-U address and the current PGW S5-U address.

At 344, the new SGW sets the current tunnel status as direct tunnel-true and saves the T-eNB S1-U address and PGW S5-U address in the PDN context. The new SGW allocates its SGW S1-U address and SGW S5-U address. After step 3G-4, the PGW 120 begins receiving the uplink packets from the T-eNB 110*b*. After receiving a first uplink user packet from the T eNB 110*b* and the source address is different from the Currently Used Downlink address, PGW 120 saves this new origination address as the new Currently Used Downlink address (i.e., replacing the previously stored "old" one). Then all subsequent downlink packets are sent to this new Currently Used Downlink address.

Then, at step 3G-6, after receiving the modify bearer request from the new SGW, the PGW 120 saves the new SGW S5-U address in the Default Downlink address field in the PDN context. At 346, the PGW 120 does not change or update the Currently Used Downlink address field. The Currently Used Downlink address field is only updated by the GTPv1-U packets. At step 3G-7, the PGW 120 sends a modify bearer response to the new SGW.

The new SGW is ready to operate in the direct-tunnel mode and, at step 3G-8, sends a modify-bearer-response message to the MME, with the direct tunnel indication, the new SGW S1-U address and the new SGW-C address. The MME 112, in turn, saves the new SGW S1-U address in the PDN context at 347 and at step 3G-9, sends a message to the T-eNB 110*b* acknowledging the path-switch-request message, with the direct-tunnel indication. At 348, the MME 112 releases resources in the old SGW 114 and the S-eNB 110*a*.

Figure 3H:
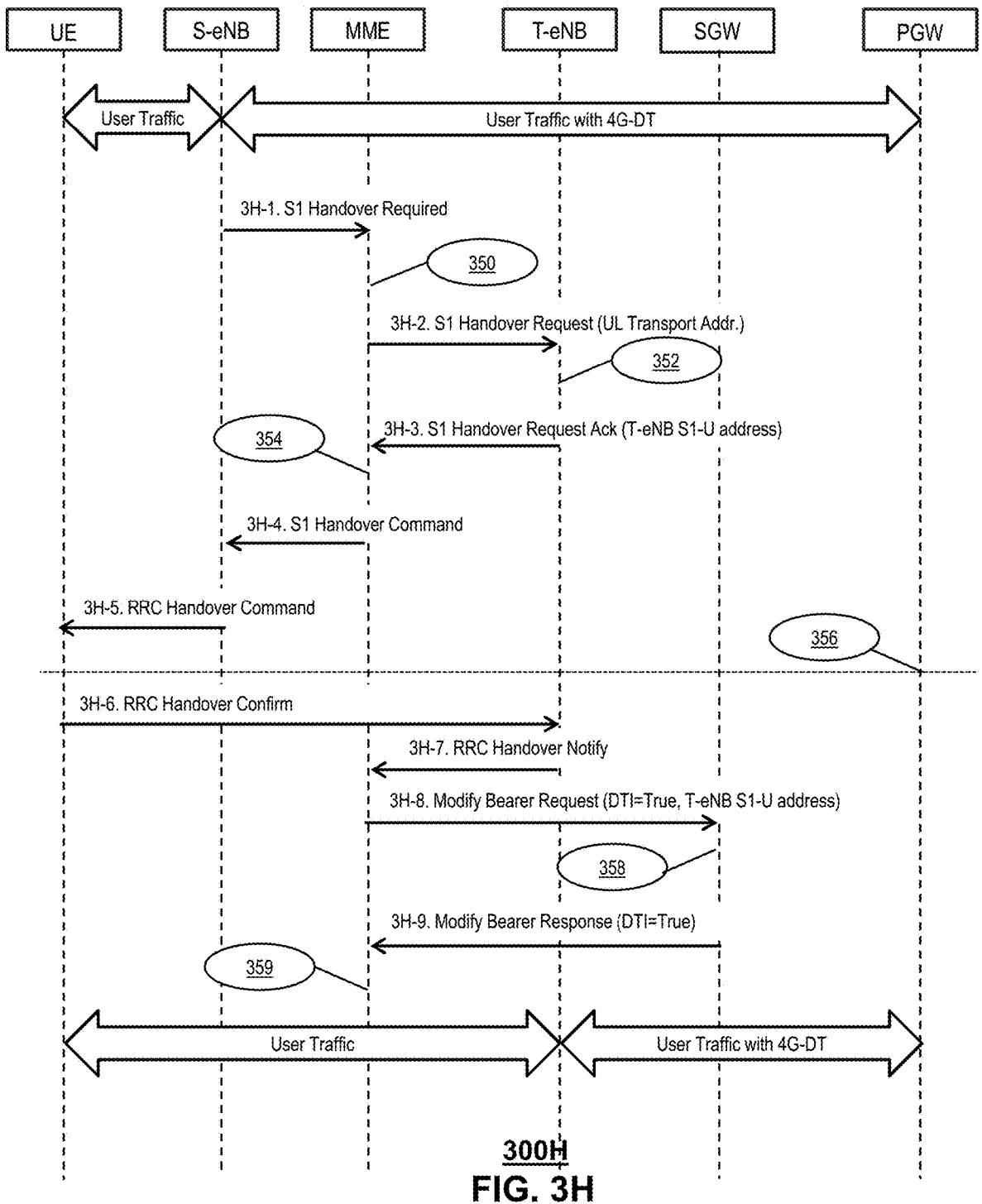

FIG. 3H illustrates an embodiment of a high-level call flow 300H associated with an intra-MME, S1 handover change under a direct tunnel configuration without a change of an associated SGW. Initially, uplink traffic is flowing directly from a source S-eNB 110*a* to a PGW 120 and downlink traffic is flowing directly from the PGW 120 to the S-eNB 110*a* as indicated by the horizontal arrow between a S-eNB 110*a* and the PGW 120. The S-eNB 110*a* detects that it is necessary to execute an S1 handover procedure and, at step 3H-1, sends an S1 handover required message to the MME 112. At 350, the MME 112 decides to continue using the direct tunnel and, at step 3H-2, sends a handover request message to a target eNB 110*b*, with an uplink transport address. At 352, the T-eNB 110*b* saves the uplink transport addresses that are PGW S5-U addresses and prepares to send the uplink traffic to the PGW S5-U addresses. At step 3H-3, the T-eNB 110*b* replies with a handover request acknowledgment message to the MME 112, with the T-eNB S1-U address.

At 354, the MME sets the current tunnel status as "direct tunnel" and saves the T-eNB S1-U address in an updated PDN context. At step 3H-4, the MME 112 sends an S1 handover-command to the S-eNB 110*a*. The S-eNB 110*a*, in turn, sends an RRC handover command to the UE 108. At 356, the T-eNB saves the PGW S5-U address and prepares to send the uplink traffic to the PGW S5-U address. At step 3H-5, the T-eNB sends a message acknowledging the S1 handover request after allocating the necessary resources. The acknowledgement includes a direct tunnel indication and the new eNB S1-U address.

At 356, the PGW 120, after step 5, begins receiving the uplink packets from the T-eNB 110*b* at any time. After receiving the first uplink user packet from the T-eNB 110*b* and the source address is different from the Currently Used Downlink address, PGW 120 saves the new origination address as the new Currently Used Downlink address (i.e., replacing the former "old" one). Then all subsequent downlink packets can be sent to this new Currently Used Downlink address.

At step 3H-6, the UE sends an RRC handover confirmation to the T-eNB 110*b*. At step 3H-7, the T-eNB 110*b* executes an RRC handover, sending an RRC handover notification to the MME 112.

At step 3H-8, the MME 112 sends a modify bearer request to the SGW 114. The modify bearer request includes a direct tunnel indicator and a T-eNB S1-U address. At 358, the SGW 114 saves the T-eNB S1-U address and keeps the tunnel status as "direct tunnel." At this point, the SGW 114 is ready for the direct tunnel solution. At step 3H-9, the SGW 114 sends a modify-bearer response message to the MME 112, with the direct tunnel indication. At 359, the MME 112 cleans up the resources in the S-eNB 110*a* and the associated resources in the SGW 114 for the former or "old" call leg. At this point, the T-eNB 110*b* can send uplink traffic to the PGW 120 and the PGW 120 can send downlink traffic to the T-eNB 110*b*.

Figure 3I:
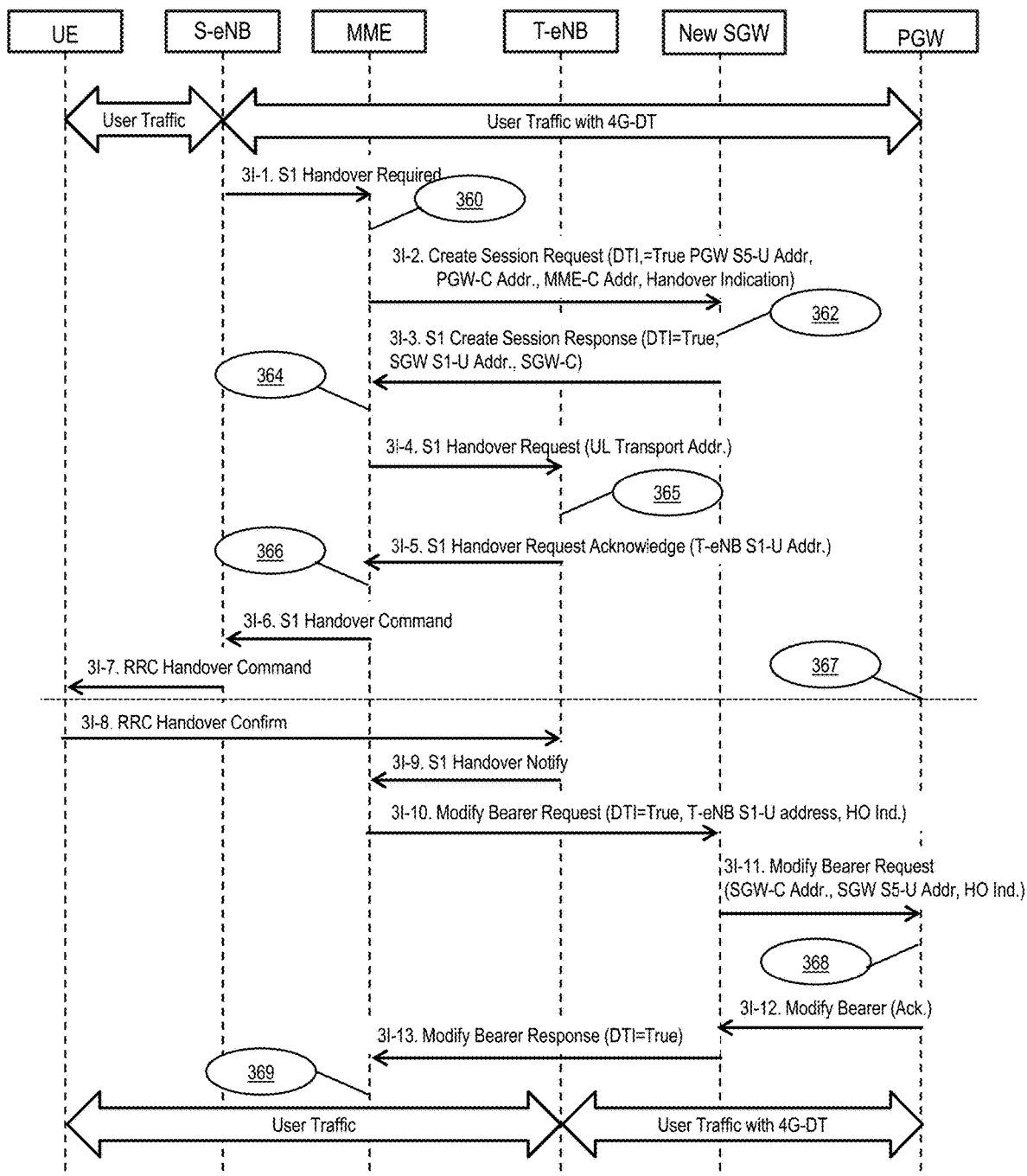

FIG. 3I illustrates an embodiment of a high-level call flow 300I associated with an intra-MME, S1 handover under a direct tunnel configuration with a change of an associated SGW. Initially, uplink traffic is flowing directly from a source eNB (S-eNB) 110*a* to the PGW 120 and downlink traffic is flowing directly from the PGW 120 to the S-eNB 110*a* as indicated by the horizontal arrow between the S-eNB 110*a* and the PGW 120.

At step 3I-1, the S-eNB 110*a* detects that it is necessary to execute a S1 handover and sends an S1 handover required message to a source MME 112 (S-MME). Note at 360 that the MME 112 decides the SGW 114 should be relocated and that the new SGW should continue with a direct tunnel. At step 3I-2, the MME 112 sends a create session request message to the new SGW, with a direct-tunnel indication, the PGW S5-U address, the PGW-C address, the MME-C address and a handover indication. At 362, the new SGW sets the current tunnel status as "direct tunnel" and saves the PGW S5-U address for the PDN context. The new SGW then allocates the SGW S1-U address and SGW S5-U address. The new SGW, at step 3I-3, sends a create session response message to the MME 112, with the direct-tunnel indication, the SGW S1-U address and the SGW-C address. At 364, the MME 112 sets the current tunnel status as direct tunnel and saves the new SGW S1-U address in the PDN context. At step 3I-4, the MME 112 sends a handover request message with an uplink transport address to the T-eNB 110*b*.

At 365, the T-eNB 110*b* saves the uplink transport addresses, which are the PGW S5-U addresses, and prepares to send the uplink traffic to PGW S5-U address. At step 3I-5, the T-eNB 110*b* sends a handover request acknowledgment message including the T-eNB S1-U address. At 366, the MME 112 saves the T-eNB S1-U address in the PDN context. At step 3I-6, the MME sends an S1 handover command to the S-eNB 110*a*. At step 3I-7, the S-eNB 100*a*, in turn, sends an RRC handover command to the UE 108. After step 3I-7, the PGW 120 can begin to receive uplink packets from the T-eNB 110*b* at any time. After receiving the first uplink user packet from the T-eNB 110*b* and determining that the source address is different from the Currently Used Downlink address, the PGW 120 saves the new origination address as a Currently Used Downlink address (i.e., replacing the former or "old" one). Then all subsequent downlink packets can be sent to the new Currently Used Downlink address.

At step 3I-8, the UE 108 sends an RRC handover confirm message to the T-eNB 110*b*. At step 3I-9, the T-eNB 110*b* sends a handover notify message to the MME 112. At step 3I-10, the MME 112 sends a modify bearer request to the new SGW. The message includes an indication of a direct tunnel, a T-eNB S1-U address and a handover indicator. At step 3I-11, the new SGW sends a modify bearer request message to the PGW 120. The message includes an SGW-C address, an SGW S5-U address and a handover indicator.

At 368, the PGW 120 recognized that the SGW is relocated and saves the new SGW S5-U addresses as a new Default Downlink address. At step 3I-12, the PGW 120 sends a modify bearer acknowledgment message with a direct-tunnel indication to the New SGW. At this point, the new SGW is ready to operate in the direct tunnel mode. At 3I-13, the new SGW sends modify bearer response message to the MME 112, with the direct-tunnel indication. At 369, the MME 112 cleans up the resources in the S-eNB 110*a* and in the former SGW for the former or "old" call leg.

Figure 3J:
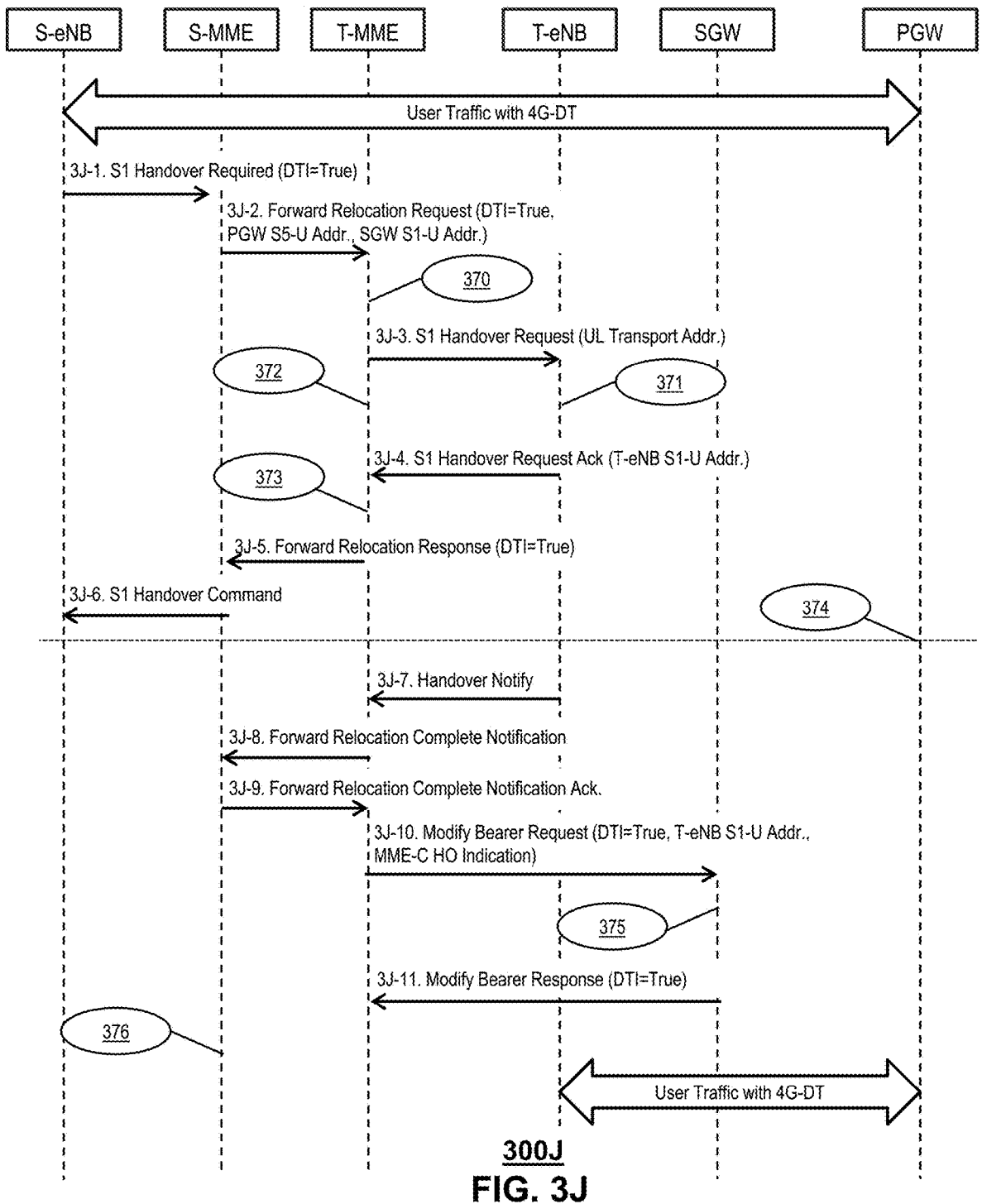

FIG. 3J illustrates an embodiment of a high level call flow 300J associated with an inter-MME handover change under a direct tunnel configuration without a change of an associated serving gateway. Initially, uplink traffic is flowing directly from a source S-eNB 110*a* to a PGW 120 and downlink traffic is flowing directly from the PGW 120 to the S-eNB 110*a* as indicated by the horizontal arrow between the S-eNB 110*a* and a PGW 120.

At step 3J-1, a source eNB (S-eNB) 110*a* detects that it is necessary to execute an S1 handover and sends an S1 handover required message to a S-MME 112. The message includes a direct tunnel indication. At step 3J-2, the S-MME 112 decides that an MME relocation is required. The S-MME 112 sends a forward relocation request message to a target MME (T-MME) (not shown), with a direct tunnel indication, the SGW S1-U address and the PGW S5-U address. At 370, the T-MME sets the current tunnel status as "direct tunnel" and saves the PDN context, including the SGW S1-U address and PGW S5-U address. The T-MME decides that an SGW relocation is not required. The T-MME decides to try the direct tunnel and retrieves the PGW S5-U address. At step 3J-3, the T-MME sends an S1 handover-request message to the target eNB (T-eNB), with the direct tunnel indication and an uplink transport address.

At 371, the T-eNB 110*b* saves the uplink transport address and prepares to send the uplink traffic to the PGW S5-U address. At 372, the T-MME sets the current tunnel status as "direct tunnel" and saves the new eNB S1-U address in the PDN context. At step 3J-4, the T-eNB 110*b* sends a handover request acknowledgement to the T-MME. The message includes the T-eNB S1-U address. At 373, the T-MME saves the new eNB S1-U address in the PDN context. The T-MME acknowledges the forward-relocation-request message, at step 3J-5, by sending a forward-relocation-response message to the S-MME 112, with the direct tunnel indication. At step 3J-6, the source MME 112 sends the S1 handover command to the S-eNB 110*a*.

After step 3J-6, the PGW 120 can begin receiving the uplink packets from the T-eNB 110*b* at any time. After receiving the first uplink user packet from the T-eNB 110*b* and determining that the source address is different from the Currently Used Downlink address, the PGW 120 saves this new origination address as the new Currently Used Downlink address (i.e., replacing the former or "old" one). Then all subsequent downlink packets are sent to the new Currently Used Downlink address.

The T-eNB 110*b* confirms the handover, at step 3J-7, by sending the S1 handover command to the T-MME. At step 3J-8, the T-MME sends a forward-relocation-complete-notification message to the S-MME. At step 3J-9, the S-MME sends a forward-relocation-complete-notification acknowledgement message to the T-MME. At step 3J-10, The T-MME sends a modify-bearer-request message to the SGW 114, indicating that an S1 handover has completed and the direct-tunnel configuration is used on the T-eNB 110*b* and providing the T-eNB S1-U address, the MME-C address and a handover indicator.

At 375, the SGW 114 saves the target eNB S1-U address and keeps the tunnel status as "direct tunnel." At step 3J-11, the SGW 114 sends a modify-bearer-response message with the direct-tunnel indication to the T-MME. At 376, the S-MME cleans up the resources in the S-eNB 110*a* and the associated resources in the SGW 114. User traffic is subsequently exchanged between the T-eNB 110*b* and the PGW 120 by way of a direct tunnel.

Figure 3K:
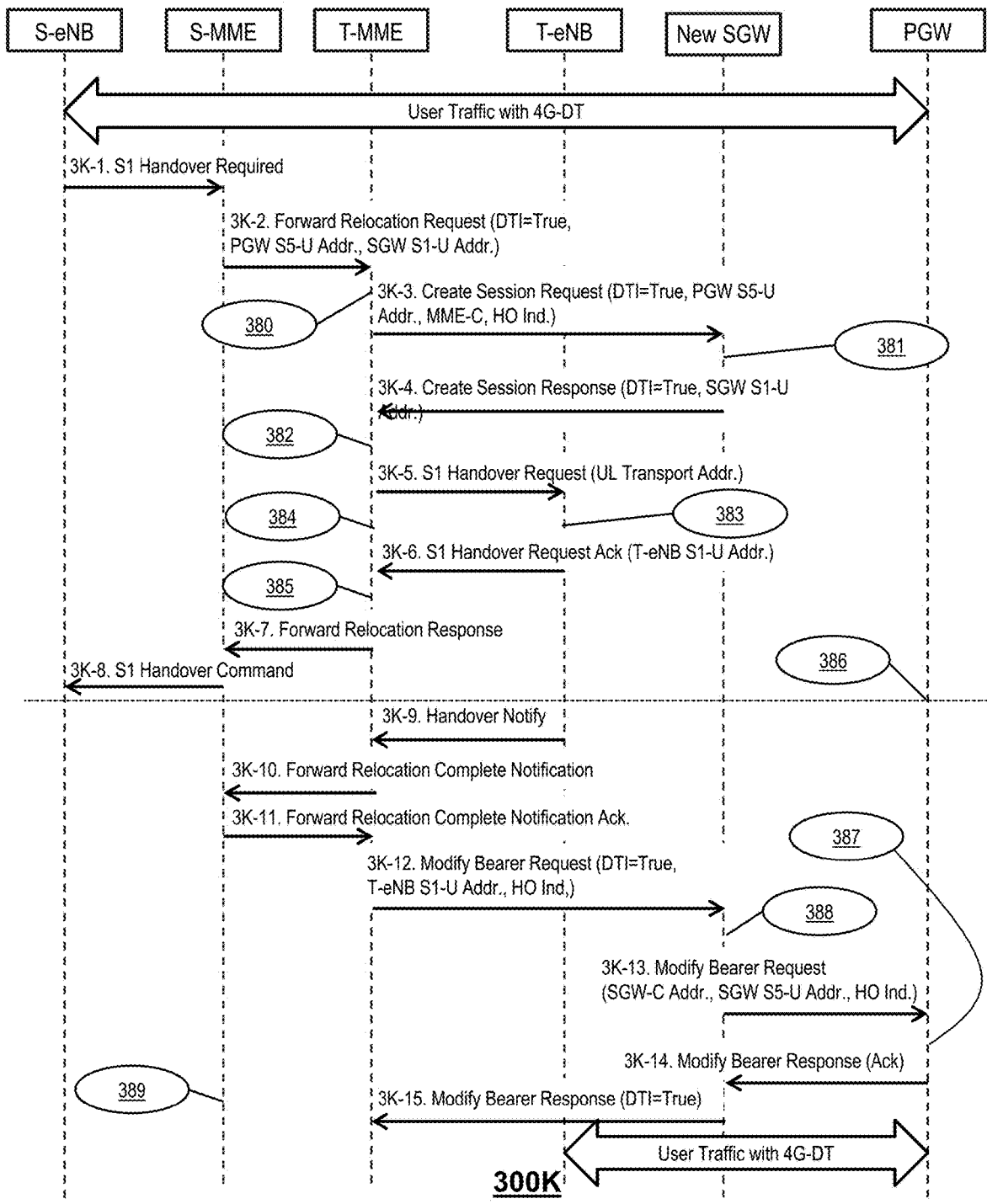

FIG. 3K illustrates an embodiment of a high-level call flow 300K associated with an inter-MME handover change under a direct tunnel configuration with a change of an associated SGW. Initially, uplink traffic is flowing directly from a source S-eNB 110*a* to a PGW 120 and downlink traffic is flowing directly from the PGW 120 to the S-eNB 110*a* as indicated by the horizontal arrow between the S-eNB 110*a* and a PGW 120.

At step 3K-1, the S-eNB 110*a* sends a handover required message to a S MME 112. The S-MME 112 sends a forward relocation request message to a T-MME (not shown). The message includes a direct tunnel indicator, a PGW S5-U address and an SGW S1-U address. At 380, the T-MME continues the direct tunnel solution and sets the current tunnel status as direct tunnel, also saving the PDN context, including the PGW S5-U address. The T-MME decides that SGW relocation is required.

At step 3K-3, the T-MME sends a create session request message to a new SGW. The message includes a direct tunnel indicator, the PGW S5-U addresses, MME-C address and a handover indication. At 381, the new SGW sets the tunnel status as direct tunnel and saves the PGW S5-U address for the PDN Context. Then it allocates its SGW S1-U address and SGW S5-U address.

At step 3K-4, the new SGW sends a create session response message to the T-MME. The message includes a direct tunnel indicator and a new SGW S1-U address. At 382, the T-MME saves the new SGW S1-U address in the PDN context. At step 3K-5, the T-MME sends an S1 handover request message to the T-eNB 110b. The message includes uplink transport addresses. In particular, the T-MME, at 384, can send the PGW S5-U addresses in the uplink transport address fields, when the direct tunnel is used. The T-eNB 110b, at 383, saves the uplink transport address and prepares to send the uplink traffic to the PGW S5-U address.

At step 3K-6, the T-eNB 110b sends an S1 handover request acknowledgement along with the T-eNB S1-U addresses. At 385, the T-MME saves the new T-eNB S1-U addresses in the PDN context. At step 3K-7, the T-MME sends a forward relocation response message to the S-MME 112. The S-MME, in turn, sends an S1 handover command to the S-eNB 110 at step 3K-8. At 386, the PGW 120 can begin receiving the uplink packets, after step 3K-8, from the T-eNB 110b at any time. After receiving the first uplink user packet from the T-eNB 110b and the source address is different from the Currently Used Downlink address, the PGW 120 can save this new origination address as a new Currently Used Downlink address (i.e., replacing the former or "old" one). Then all subsequent downlink packets can be sent to this new Currently Used Downlink address.

At step 3K-9, the T-eNB sends a handover notify message to the T-MME. The T-MME, in turn, sends a forward relocation complete notification to the S-MME at step 3K-10. The S-MME, in turn, sends a forward relocation complete notification acknowledgement message to the T-MME at step 3K-11. At 3K-12, the T-MME sends a modify bearer request, with a direct tunnel indicator, the T-eNB S1-U addresses and a handover indicator. At 388, the new SGW saves the T-eNB S1-U addresses, such that the new SGW is prepared to undertake a direct tunnel solution.

The new SGW sends a modify bearer request message to the PGW 120 at step 3K-13. The message includes the SGW-C address, the SGW S5-U addresses, and a handover indication. It is worth noting at 387 that the PGW recognizes that the SGW is relocated and saves the SGW S5-U address as the Default Downlink address. At step 3K-14, the PGW 120 sends a modify bearer response acknowledgement message to the new SGW. At step 3K-15, the new SGW sends a modify bearer response message to the T-MME with a direct tunnel indicator. At 389, the S-MME 112 cleans up the resources in the S-eNB 110a and in the former SGW for the former or old call leg. User traffic is processed between the T-eNB and the PGW 120 according to a direct tunnel.

High-level call flows can be identified for direct tunnel applications related to an inter RAT handoff into an LTE network. Due to complexity of the Inter-RAT handoff into the LTE network, the MME can establish an initial session with a two-tunnel solution. Once the IRAT handoff is completed and the MME has verified the subscription, the MME can trigger an active session to switch from a two-tunnel solution to a direct tunnel architecture. An example of such a procedure is shown in the high-level call flow of FIG. 3E.

Figure 4:
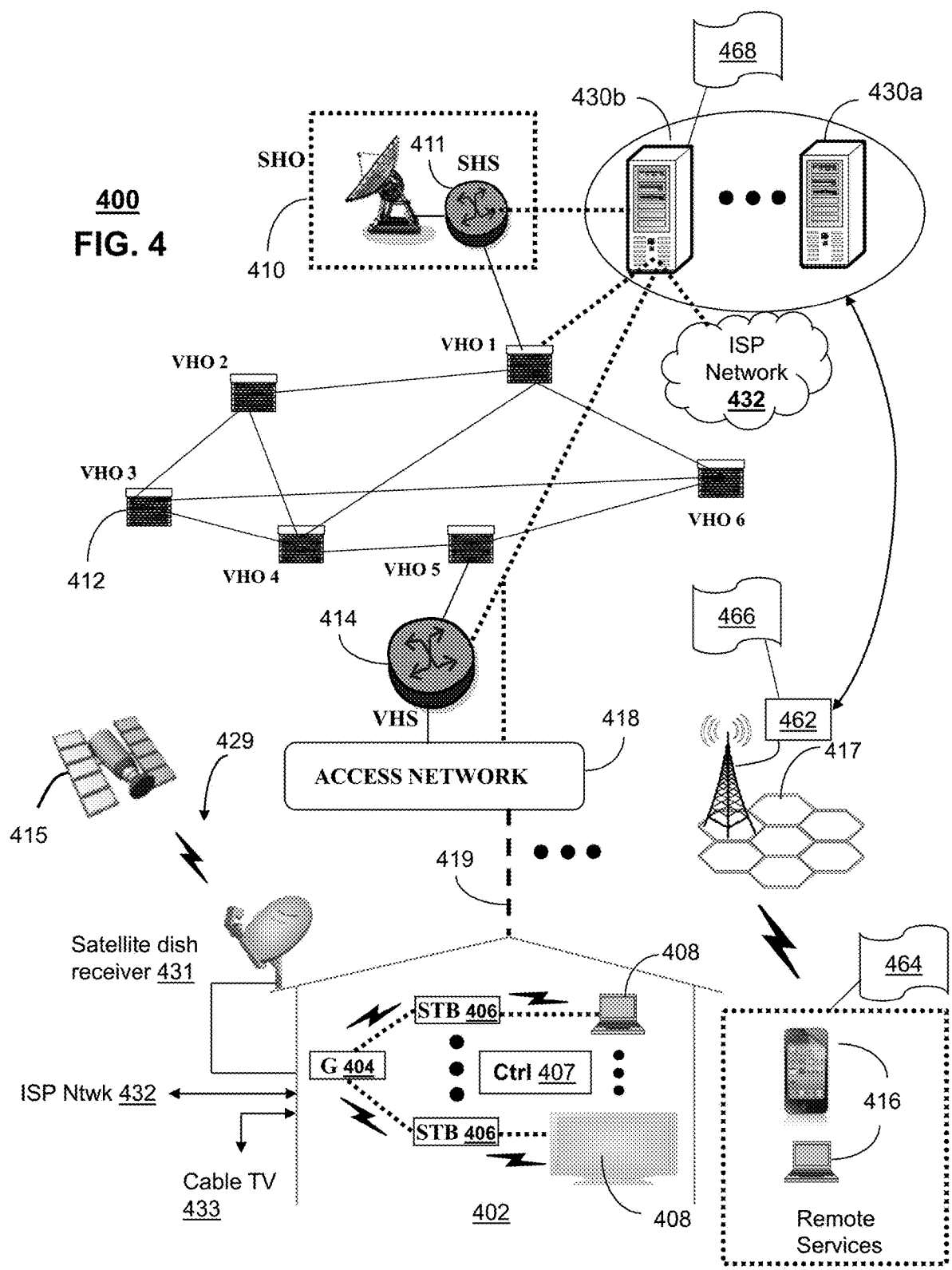
FIG. 4 depicts illustrative embodiments of communication systems that provide media services over communication network topologies including the LTE topology.

FIG. 4 depicts an illustrative embodiment of a first communication system 400 for delivering media content. The communication system 400 can represent an Internet Protocol Television (IPTV) media system. Communication system 400 can be overlaid or operably coupled with an LTE-EPS network, such as the example network depicted in FIG. 1, as another representative embodiment of communication system 400. In some embodiments, the LTE-EPS network 462, 460 facilitates a network connection between a wireless access node, e.g., eNB 462, and a packet data network, e.g., the ISP network 432 or the access network 418, in response to a request from a wireless device, e.g., UE 416, in communication with the wireless access node 462. Responsive to certain eligibility requirements being satisfied, a direct tunnel is established between the wireless access node and a packet gateway 430b in the EPS network 460. According to the direct tunnel, a serving gateway functions, e.g., implemented in a serving gateway 430a of the EPS network 460, typically used in connection with mobility is substantially bypassed.

The system 100 of FIG. 1 as another representative embodiment of communication system 400. For instance, one or more devices illustrated in the communication system 400 of FIG. 4 determine a default downlink forwarding address of a first interface of a user plane and a currently used downlink forwarding address of the first interface of the user plane. One of an uplink user data packet comprising an origination address of a second interface of the user plane, a downlink user data packet comprising a destination address of the second interface of the user plane or both are received, and one of the default downlink forwarding address, the currently used downlink forwarding address or both are modified based on the uplink origination address, the destination address or both to redirect an associated packet flow within the user plane.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

The communication system 400 can also provide for all or a portion of the computing devices 430*a*, 430*b* to function as network elements of an LTE-EPS network 460 (herein referred to as a SGW 430*a* and a PGW 430*b*). The network entities 430*a*, 430*b* (generally 430) can use computing and communication technology to perform function 468, which can include among other things, implementing usage of a direct tunnel, essentially bypassing the SGW 430*a* and redirecting or otherwise configuring packet flows of the direct tunnel based on user plane messaging, without requiring corresponding control plane messages. Namely, the PGW 430*b* monitors uplink and downlink messages, obtaining peer addresses from the messages, and configuring redirections of packet flows according to predetermined logic. A wireless access terminal, such as an eNB 462 and wireless communication devices 416 can be provisioned with software functions 466 and 464, respectively, to coordinate usage of such direct tunnels.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
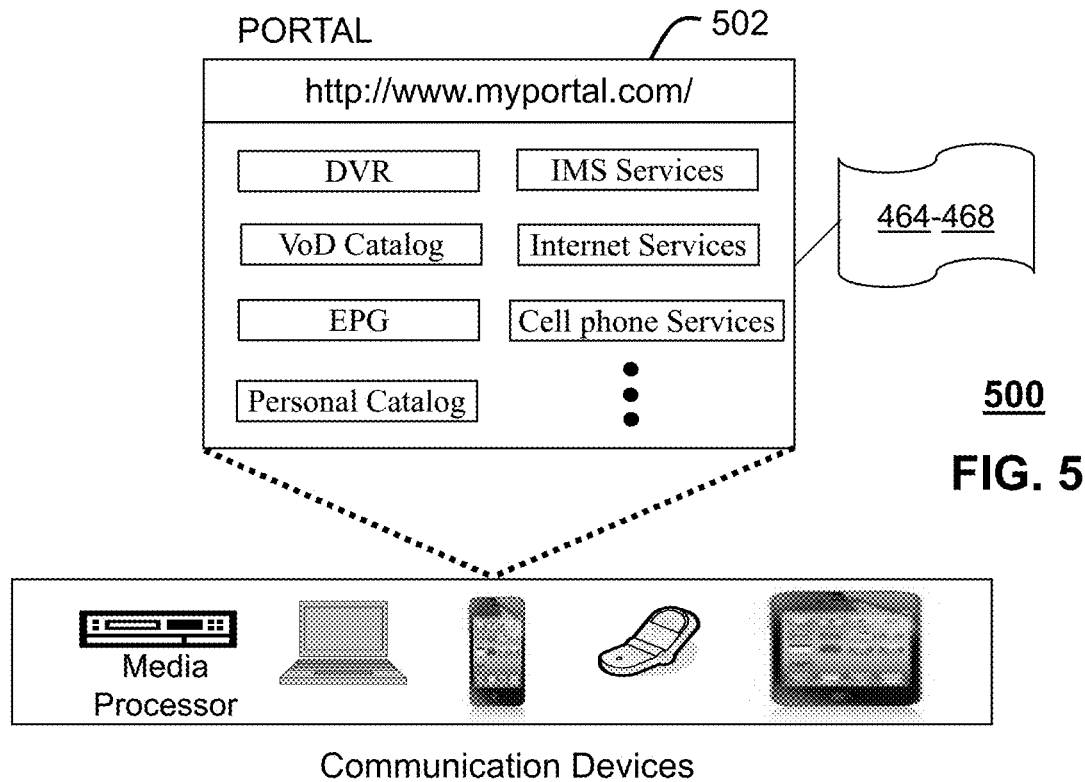
FIG. 5 depicts an illustrative embodiment of a web portal for interacting with the communication systems of FIGS. 1 and 4.

FIG. 5 depicts an illustrative embodiment of a web portal 502 of a communication system 500. The communication system 500 can be overlaid or operably coupled with the network architecture 100 of FIG. 1 and the communication system 400 as another representative embodiment of the systems 100 of FIG. 1, and/or communication system 400 of FIG. 4. The web portal 502 can be used for managing services of the system 100 of FIG. 1 and/or the communication system 400. A web page of the web portal 502 can be accessed by a Uniform Resource Locator (URL) with an Internet browser using an Internet-capable communication device such as those described in FIG. 1 and FIG. 4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 502 can further be utilized to manage and provision software applications 462-468, to adapt these applications as may be desired by subscribers and/or service providers of the system 100 of FIG. 1 and the communication system 400 of FIG. 4. For instance, users of the services provided by server 430 can log into their on-line accounts and provision the servers 110 or server 430 with user profile, mobility triggers, provide contact information to server to enable it to communication with devices described in FIGS. 1 and 3-4, and so on. Service providers can log onto an administrator account to provision, monitor and/or maintain the system 100 of FIG. 1 or server 430.

Figure 6:
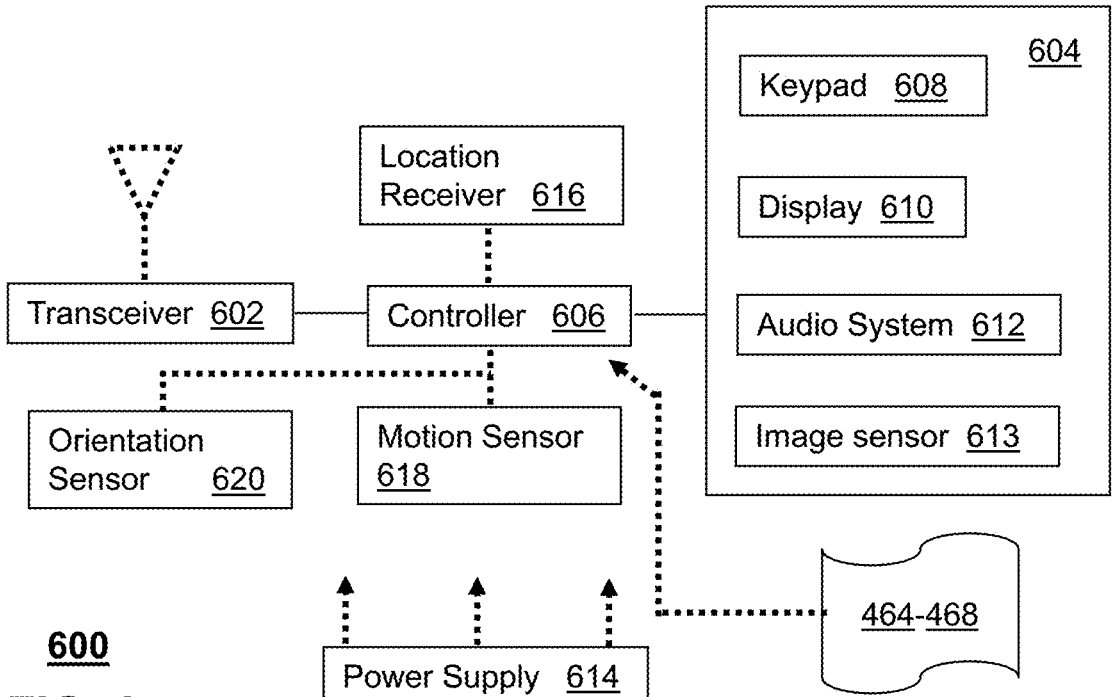
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIG. 4. The communication device 600 in whole or in part can represent any of the communication devices described in FIGS. 1 and 3-4 and can be configured to perform portions of methods 200A, 200B, 200C, and/or 200D of FIGS. 2A-2D.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the devices of FIG. 1, the media processor 406, the media devices 408, or the portable communication device 416 of FIG. 4. It will be appreciated that the communication device 600 can also represent other devices that can operate in the system of FIG. 1, communication systems 400 of FIG. 4 such as a gaming console and a media player. The communication device 600 shown in FIG. 6 or portions thereof can serve as a representation of one or more of the devices of the system of FIG. 1, and/or the communication system 400. In addition, the controller 606 can be adapted in various embodiments to perform the functions 462-468, respectively.

Upon reviewing the aforementioned embodiments, it would be evident to an artisan with ordinary skill in the art that said embodiments can be modified, reduced, or enhanced without departing from the scope of the claims described below. For example, although the embodiments disclosed herein are directed to LTE-EPS network architectures, it is envisioned that the techniques can be applied more broadly to other packet data network configurations that employ separate control plans and data plans, and particularly for such configurations that support tunneling. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
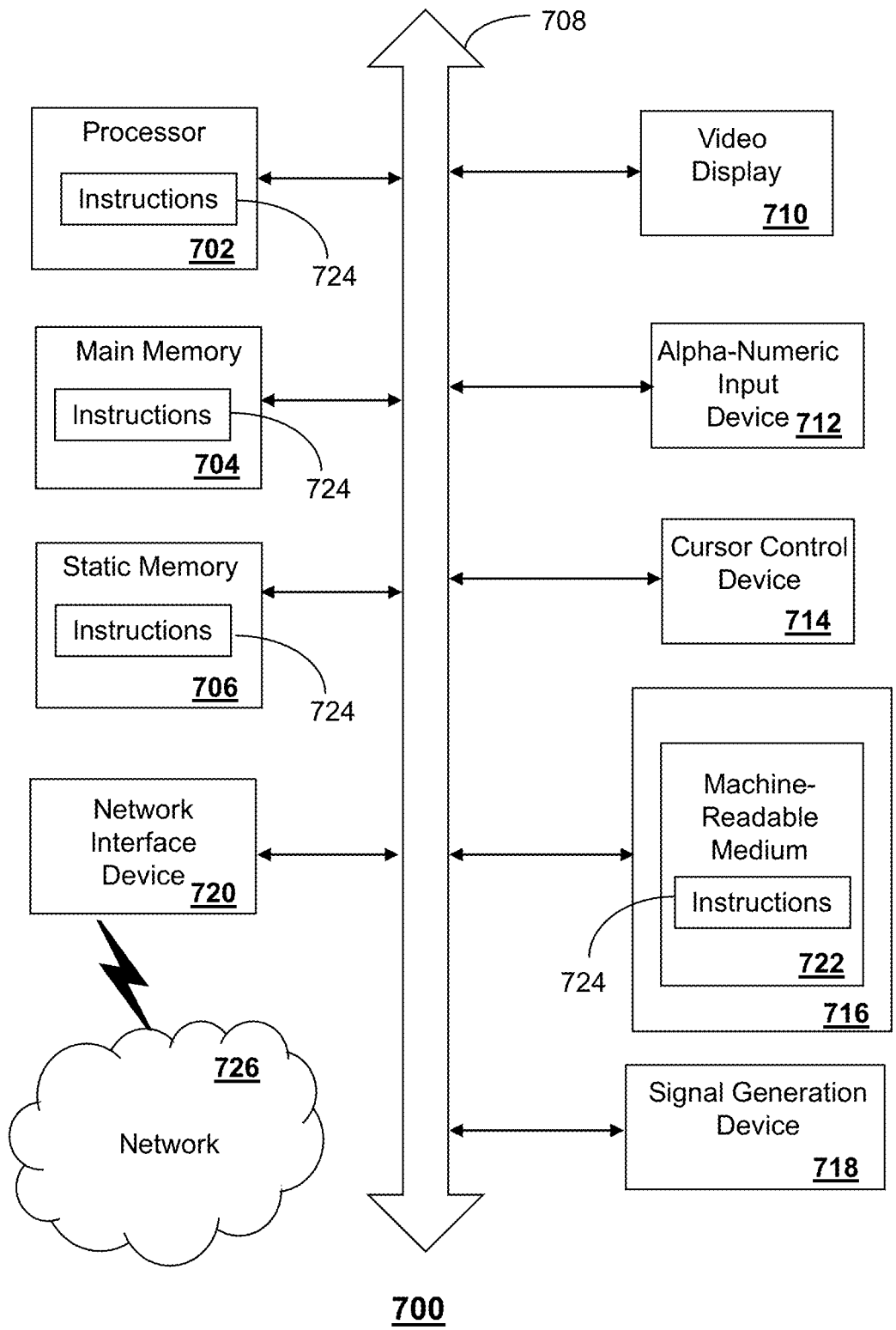
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the PGW 430, the media processor 406, the UE 108, the eNB 110, the MME 112, the SGW 114, the HSS 116, the PCRF 118, the PGW 120 and other devices of FIGS. 1 and 3-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
  a processing system including a processor; and
  a memory that stores executable instructions that, when executed by the processing system, facilitate performance of operations, the operations comprising:
    modifying a first forwarding address of a first interface of a user plane based on an origination address of a second interface of the user plane, a destination address of the second interface of the user plane or both, wherein the modifying of the first forwarding address redirects an associated packet flow within the user plane over a direct tunnel established between an e-node B and a packet data network serving gateway of a core network; and
    terminating, in response to receiving an end-marker message, the direct tunnel.

2. The device of claim 1, wherein the first forwarding address comprises a default downlink forwarding address and a currently used downlink forwarding address.

3. The device of claim 2, wherein the operations further comprise forwarding a downlink packet using the default downlink forwarding address, subsequent to the terminating the direct tunnel.

4. The device of claim 2, wherein the modifying the first forwarding address comprises modifying one of the default downlink forwarding address, the currently used downlink forwarding address or both, and wherein the modifying is accomplished without a corresponding exchange of messages in a control plane usable to configure packet data forwarding within the user plane.

5. The device of claim 1, wherein the end-marker message indicates an end of a payload stream on the direct tunnel.

6. The device of claim 1, wherein the operations further comprise receiving, by way of the user plane, one of an uplink user data packet comprising the origination address, a downlink user data packet comprising the destination address or both.

7. The device of claim 1, wherein the operations further comprise:
  receiving a request to establish the direct tunnel; and
  determining eligibility for establishing the direct tunnel in accordance with predetermined eligibility criteria.

8. The device of claim 1, wherein the operations further comprise determining whether the direct tunnel has been established between the e-node B and the packet data network serving gateway of the core network.

9. The device of claim 8, wherein the determining whether the direct tunnel has been established further comprises detecting a direct tunnel indictor.

10. The device of claim 1, wherein the core network comprises a long-term evolution core network, and wherein the end-marker message comprises a serving gateway S5 user plane address.

11. A non-transitory machine-readable storage medium comprising executable instructions that, when executed by a processing system including a processor, facilitate performance of operations, the operations comprising:
  receiving a request for a network connection including a tunnel solution;
  modifying a first forwarding address of a first interface of a user plane based on an origination address of a second interface of the user plane, a destination address of the second interface of the user plane or both, wherein the modifying of the first forwarding address redirects an associated packet flow within the user plane over a direct tunnel established, in response to the request, between an e-node B and a packet data network serving gateway of a core network; and
  terminating, in response to receiving an end-marker message, the direct tunnel.

12. The non-transitory machine-readable storage medium of claim 11, wherein the first forwarding address comprises a default downlink forwarding address and a currently used downlink forwarding address.

13. The non-transitory machine-readable storage medium of claim 12, wherein the operations further comprise forwarding a downlink packet using the default downlink forwarding address, subsequent to the terminating the direct tunnel.

14. The non-transitory machine-readable storage medium of claim 12, wherein the modifying the first forwarding address comprises modifying one of the default downlink forwarding address, the currently used downlink forwarding address or both.

15. The non-transitory machine-readable storage medium of claim 11, wherein the operations further comprise receiving, by way of the user plane, one of an uplink user data packet comprising the origination address, a downlink user data packet comprising the destination address or both.

16. A method comprising:
  determining, by a processing system including a processor, whether a direct tunnel has been established between an e-node B and a packet data network serving gateway of a core network;
  modifying, by the processing system, a first forwarding address of a first interface of a user plane based on an origination address of a second interface of the user plane, a destination address of the second interface of the user plane or both, wherein the modifying of the first forwarding address redirects an associated packet flow within the user plane over the direct tunnel; and
  terminating, by the processing system in response to receiving an end-marker message, the direct tunnel.

17. The method of claim 16, wherein the first forwarding address comprises a default downlink forwarding address and a currently used downlink forwarding address.

18. The method of claim 17, further comprising forwarding, by the processing system, a downlink packet using the default downlink forwarding address, subsequent to the terminating the direct tunnel.

19. The method of claim 17, wherein the modifying the first forwarding address comprises modifying one of the default downlink forwarding address, the currently used downlink forwarding address or both.

20. The method of claim 16, further comprising receiving, by the processing system via the user plane, one of an uplink user data packet comprising the origination address, a downlink user data packet comprising the destination address or both.

* * * * *

UNITED STATES PATENT AND TRADEMARK OFFICE
CERTIFICATE OF CORRECTION

PATENT NO. : 11,153,802 B2
APPLICATION NO. : 16/527440
DATED : October 19, 2021
INVENTOR(S) : Jiansong Wang et al.

Page 1 of 1

It is certified that error appears in the above-identified patent and that said Letters Patent is hereby corrected as shown below:

In the Specification

In Column 6, Line 50, please delete "dashed line 130 can be considered as an Sha signaling" and insert
-- dashed line 130 can be considered as an S6a signaling --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*